United States Patent [19]

Yahisa et al.

[11] Patent Number: 5,236,791
[45] Date of Patent: Aug. 17, 1993

[54] MAGNETIC RECORDING MEDIUM AND MAGNETIC STORAGE

[75] Inventors: Yotsuo Yahisa, Fucho; Yoshihiro Shiroishi, Hachioji; Sadao Hishiyama, Sayama; Tomoyuki Ohno, Kokubunji; Shinichiro Saitoh, Tokyo; Suzuki Hiroyuki, Kawasaki; Yoshibumi Matsuda, Kokubunji; Norikazu Tsumita, Kanagawa; Masaki Ohura; Noriyuki Shige, both of Odawara; Kazumasa Takagi, Tokyo, all of Japan

[73] Assignee: Hitachi, Ltd., Tokyo, Japan

[21] Appl. No.: 399,775

[22] Filed: Aug. 28, 1989

[30] Foreign Application Priority Data

Aug. 31, 1988 [JP] Japan ................. 63-214964
Sep. 14, 1988 [JP] Japan ................. 63-228674

[51] Int. Cl.⁵ .......... G11B 5/66; B32B 15/00; H01F 1/00
[52] U.S. Cl. .................. 428/694 TP; 428/611; 428/622; 428/627; 428/629; 428/632; 428/639; 428/641; 428/660; 428/667; 428/670; 428/678; 428/695; 428/900
[58] Field of Search ............ 428/611, 694, 695, 900, 428/622, 627, 629, 632, 639, 641, 660, 667, 670, 678

[56] References Cited

U.S. PATENT DOCUMENTS

| Re. 32,464 | 7/1987 | Alne | 428/622 |
| 4,411,963 | 10/1983 | Aine | 428/900 |
| 4,456,661 | 6/1984 | Yamamoto | 428/694 |
| 4,678,722 | 7/1987 | Cohen | 428/670 |
| 4,701,374 | 10/1987 | Sagoi et al. | 428/900 |
| 4,755,426 | 7/1988 | Kokai et al. | 428/900 |
| 4,756,967 | 7/1988 | Hashimoto et al. | 428/900 |
| 4,774,130 | 9/1988 | Endo et al. | 428/900 |
| 4,839,244 | 6/1989 | Tsukamoto | 428/694 |
| 4,840,844 | 6/1989 | Futomoto et al. | 428/900 |

FOREIGN PATENT DOCUMENTS

| 58-27941 | 2/1983 | Japan . |
| 61-54017 | 3/1986 | Japan . |
| 61-54019 | 3/1986 | Japan . |
| 61-96512 | 5/1986 | Japan . |
| 61-214115 | 9/1986 | Japan . |
| 61-224122 | 10/1986 | Japan . |
| 63-4419 | 1/1988 | Japan . |
| 63-66722 | 3/1988 | Japan . |

Primary Examiner—Paul J. Thibodeau
Assistant Examiner—Leszek Kiliman
Attorney, Agent, or Firm—Kenyon & Kenyon

[57] ABSTRACT

A magnetic recording medium that uses, as a protective coating layer provided on a magnetic layer for magnetically recording signals, a layer made of a nonmagnetic material consisting of two ore more elements of Ti, Zr, Hf, V, Nb, Ta, Cr, Mo, and W, and one or more elements of N, C, O, and B, or made of a magnetic material consisting of one or more elements of Co, Fe, Ni, and Gd, one or more elements of Ti, Zr, Hf, V, Nb, Ta, Cr, Mo, and W, and one or more elements of N, C, O, B, and Si is excellent in sliding endurance. When the protective coating layer is made of the nonmagnetic material, the magnetic recording medium is also excellent in corrosion resistance, and when the protective coating layer is made of the magnetic material, the spacing between a magnetic head and the magnetic recording medium can advantageously be made large. Both the cases are high in reliability, and suitable for high density magnetic recording. The magnetic recording medium can be used in combination with a magnetic head that uses a metal magnetic alloy as at least part of the magnetic core to provide an excellent magnetic storage.

44 Claims, 5 Drawing Sheets

MAGNETIC RECORDING MEDIUM AND MAGNETIC STORAGE

BACKGROUND OF THE INVENTION

The present invention relates to magnetic recording media for use, for example, in flexible type magnetic disk storages, magnetic tape storages, magnetic card storages, and rigid type magnetic disk storages, and to magnetic storages.

Investigation and development of magnetic recording media that have, as a recording layer, a thin magnetic layer such as an iron oxide thin film, an iron nitride thin film, and a magnetic metal alloy thin film are under way in order to meet the demand for high density of magnetic recording. These thin film media are in many cases formed on a nonmagnetic substrate by means, for example, of the sputtering process, the vacuum deposition process, the plating process, or the ion plating process, and it can be said that these thin film media are suitable for obtaining high recording density because, for example, the film is thin, and the coercive force and magnetization are high. However, the magnetic recording medium using such a magnetic thin film becomes susceptible to damage due to the slide of the magnetic head, and thus there is a drawback that the durability of such a medium is poor. Since magnetic recording media or the like that are used as magnetic files must have particularly high reliability, it is quite important in order to obtain high density recording.

In prior magnetic recording mediums using a continuous thin film, in order to overcome the above problem, there are proposed, for example, techniques of forming a C type protective film on a magnetic film (Japanese Patent Laid-Open Nos. 54017/1986, and 54019/1986), a technique of forming an organic fluid lubricant additionally on a C type protective film (Japanese Patent Laid-Open No. 96512/1986), a technique of forming a protective film of a carbide or nitride of Si, Zr, Hf, Ti, Ta, Nb, or W (U.S. Pat. No. 32464), and a technique of forming a protective film of a oxide, nitride, carbide, or boride of Zr, Ti, Ta, or Hf (Japanese Patent Laid-Open No. 66722/1988). Further, Japanese Patent Laid-Open No. 4419/1988 discloses the use of a protective film of a carbide of Ti, V, Cr, Zr, Nb, Mo, Hf, Ta, W, Si, or B, and Japanese Patent Laid-Open No. 214115/1986 discloses the use of a protective film of Fe-Ni-Cr alloy or the oxide thereof.

The method of forming media generally includes, for example, the sputtering process, the vacuum deposition process, the plating process, and the ion beam sputtering process, and it is known to use, for a magnetic layer, Co-Ni-Zr-N alloy described, for example, in Japanese Patent Laid-Open No. 224121/1986.

However, according to a study performed by the inventors, in the case of using a C type protective film, since, for example, the hardness of the protective film is low, the carbon is liable to be oxidized, and the adhesion of the liquid lubricant is poor, the durability of the magnetic recording medium is not sufficient in the case wherein the thickness of the protective film is made lower to about 60 nm or below. Further in the case wherein the nitride or carbide of Si, Zr, Hf, Ti, Ta, Nb, or W is used for the protective film, or in the case wherein the oxide, nitride, carbide, or boride of Zr, Ti, Ta, or Hf is used for the protective film, in spite of the fact that the hardness of the protective film is high in comparison with C, since the friction coefficient between the magnetic head and the protective film is high, the adhesive strength between the protective film and the magnetic film is low, and the material itself is relatively brittle, there were such problems that abrupt damage such as cracks or peeling was liable to occur to the magnetic recording medium. Furthermore, the sliding endurance at the time when, for example, sudden vibrations were applied to the apparatus, and the corrosion resistance were unsatisfactory.

From another point of view, in the above prior art, since the nonmagnetic protective film is provided separately, there are advantages that the degree of freedom of the selection of the protective material is high, and the sliding endurance reliability can be made very high, however, there is a problem that the space between the magnetic head and the medium is increased due to the thickness of the nonmagnetic protective film, so that high recording density is hardly realized owing to the so-called spacing loss.

SUMMARY OF THE INVENTION

The present invention has been made by taking the above points into account. The present invention solves the above-described problem, providing a magnetic recording medium excellent in sliding endurance, and corrosion resistance, and suitable for high density recording by forming, on a magnetic thin film, for example, of a metal, an oxide, or a nitride, a nonmagnetic protective coating layer whose adhesion to the magnetic layer is excellent, which is high in hardness, and toughness, and low in frictional coefficient, and to which a liquid lubricant adheres favorably, thus providing a mass magnetic storage high in reliability.

The present invention also provides a medium that excludes the above nonmagnetic protective film, is heightened in recording/reproducing characteristics, and is high in sliding endurance.

In an embodiment of the present invention at least one nonmagnetic protective coating layer made up of at least two elements selected from a first group consisting of Ti, Zr, Hf, V, Nb, Ta, Cr, Mo, and W, and at least one element selected from a second group consisting of N, C, O, and B are provided on a magnetic layer. It is desirable that the amount of one element selected from the first group is from down to 0.1 at. % to up to 99.9 at. %, and more desirably from down to 20 at. % to up to 80 at. %, assuming the total amount of the elements of the first group to be 100 at. %. The total amount of the elements of the first group is from down to 10 at. % to up to 99 at. %, assuming the the total amount of the elements of the first group and the elements of the second group to be 100 at. %. It is more preferable to make the protective layer up of two or three layers whose materials have different compositions, because that improves the corrosion resistance and the sliding endurance. It is particularly desirable that said nonmagnetic protective coating layer contains Zr, Nb, Hf, or W of the elements of the first group, and N of the elements of the second group, or contains at least W of the elements of the first group, and C of the elements of the second group. It is desirable that the thickness of the above nonmagnetic protective layer (the total thickness in the case where the nonmagnetic protective layer comprises a plurality of layers) is from down to 5 nm to up to 60 nm, more desirably from down to 10 nm to up to 40 nm, and more further desirably from down to 20 nm to up to 30 nm.

In the present invention, it is particularly effective that the magnetic thin film is a continuous thin film.

Further, it is desirable with a view to enhancing reliability that a nonmagnetic intermediate metal layer is provided between the above nonmagnetic protective coating layer and the above magnetic layer. It is desirable that the nonmagnetic intermediate metal layer is made of an alloy whose major component is at least one element selected from a third group consisting of Ti, Zr, Hf, Nb, and Ta, and which contains at least one element selected from a fourth group consisting of Pt, Pd, Rh, Ir, Ru, and Os in a total amount of from down to 0.01 at. % to up to 1 at. %, or at least one element selected from a fifth group consisting of Mo, and Ni in a total amount of from down to 0.1 wt. % to up to 1 wt. %. The above nonmagnetic intermediate metal layer may also be composed of a nonmagnetic alloy containing Ni as a major component, and at least one element selected from a sixth group consisting of Ti, V, Nb, Ta, Cr, Mo, W, Mn, Fe, Co, Cu, Al, and Si in an amount of from down to 1 wt. % to up to 40 wt. %. In this case, it is desirable that the above nonmagnetic intermediate metal layer is made of an Ni alloy containing from down to 27 wt. % to up to 34 wt. % of Cu, or an Ni alloy containing from down to 2 wt. % to up to 32 wt. % of Mo and from down to 13 wt. % to up to 25 wt. % of Cr. It is desirable that the thickness of the above nonmagnetic intermediate metal layer is from down to 2 nm to up to 15 nm, and preferably from down to 5 nm to up to 10 nm.

In another embodiment of the present invention, the protective coating layer is made of a magnetic alloy, and the magnetic alloy is formed into a plurality of layers. That is, the outermost surface layer of the multi-layered magnetic alloy film on the information recording element side is composed of a material containing at least one element selected from an eighth group consisting of Co, Ni, Fe, and Gd, at least one element selected from a ninth group consisting of Ti, Zr, Hf, V, Nb, Ta, Cr, Mo, and W, and at least one element selected from a tenth group consisting of N, C, O, B, and Si. In order to secure high output and improve over-write characteristics, all of the magnetic thin films constituting the composite magnetic thin film are magnetically joined, reversal of magnetization is made with the same coercive force against the external magnetic field, and it is preferable that the total amount of elements of the ninth group is from down to 3 at. % to up to 60 at. %, and more desirably from down to 5 at. % to up to 40 at. %, assuming the total amount of the elements of the eighth group, and the elements of the ninth group to be 100 at. %. It is desirable that the coercive force of the under-side magnetic layer is 1000 Oe or over, and the above same coercive force for the composite magnetic film is 200 Oe or over. Further, in order to improve sliding endurance, the total amount of elements of the tenth group is from down to 6 at. % to up to 80.at. %, and more desirably from down to 20 at. % to up to 60 at. %, assuming the total amount of the elements of the eighth group, the ninth group, and the tenth group to be 100 at. %, and a known organic lubricating film is provided directly on the first (on the information recording element side) magnetic thin film. Further, in order to improve recording density characteristics, the thickness of the first magnetic thin film is from down to 5 nm to up to 100 nm, and more desirably from down to 10 nm to up to 70 nm. By using a medium having at least one surface of the above present composite magnetic thin film, a magnetic storage can be provided in which spacing loss is lowered and which has a large memory capacity.

DETAILED DESCRIPTION

Figure 1:
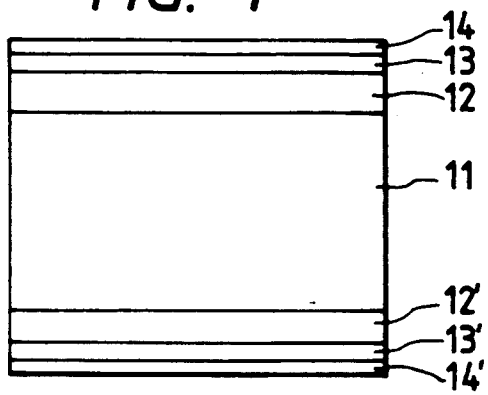
FIG. 1 is a sectional view of the magnetic disk of Example 1 of the present invention.

The present invention will now be described in detail first in the case wherein a nonmagnetic protective coating layer is used. In this case, the above effects are due to the following actions. Since the nitride, carbide, oxide, and boride of only one element selected from the first group consisting of Ti, Zr, Hf, V, Nb, Ta, Cr, Mo, and W generally have high melting points, and high hardness, in principle they can be used for a thin protective coating layer of a magnetic recording medium. However, when we have intensively studied the slide durability of the magnetic recording media respectively having protective coating layers respectively made of the nitride, carbide, oxide, and boride of only one element selected from the first group, it has been found that each medium using the compounds do not show satisfactory durability. This is because the crystal grains of the protective coating layer are relatively large, and particularly when the thickness of the protective coating layer is made to be 40 nm or below, the film is brittle, and the adhesion strength is low, and destruction is therefore liable to occur under the mechanical external force at the time of the sliding of the magnetic head with various defects, formed after the flyability test after film formation or at the time of texturizing, as starting points or with the grain boundaries as starting points. Further, since the grain boundaries and the above defects form local cells or cause dewing under high moisture, there is a problem that the function of protecting the magnetic recording medium from a corrosive environment cannot be fully effected.

In contrast, according to the inventors' intensive study, when the nitride, carbide, oxide, boride, carbonitride, oxynitride, boronitride, oxycarbide, borocarbide, or borooxide of a nonmagnetic alloy made up of at least two elements selected from the first group is used for the protective coating layer of the magnetic recording medium, the protective coating layer as a whole will be made up of very fine crystal grains whose size is equal to, smaller than, or half of the thickness of the protective coating film, or will be dominantly amorphous in a more typical case. Further, since the elements of the first group are liable to form various compounds with N, C, O, and B that have smaller atomic radii, and are high in directionality of the chemical bonds, the protective coating layer is apt to form a mixed texture of fine phases made up of various combinations possible to the constitutional elements. Therefore, in comparison with the protective film consisting of a compound made up of only one element of the first group, and N, C, O, or B, in the case of the protective coating layer containing at least two elements of the first group, the film texture and the film structure are complicated, and the above phases uniformly cover the magnetic layer, or serve as projections to support the head so that they may protect the magnetic layer in a complementary manner, thereby allowing both the slide durability and the corrosion resistance to be improved at the same time.

Further, since the above effects are remarkably increased when two or more elements of the first group and two or more elements of the second group consisting of N, C, O, and B are included, a magnetic recording medium having particularly excellent slide durability and corrosion resistance can be obtained.

Since the above effects can be recognized when the above mixed texture is formed in only part of the protective coating layer, it is good if the content of one element of the first group is from down to 0.1 at. % to up to 99.9 at. %, assuming the total amount of the elements of the first group to be 100 at. %.

Further, the protective coating layer rich in amorphous components has advantages that the coverability is high, the protective coating layer is tough against mechanical external forces, the surface is smooth, the frictional force and the frictional coefficient between the magnetic head and the protective coating layer are small, and the slide durability can be improved. Further, it is more preferable when at least one of Y, Mg, Ca, Sc, Fe, Co, Ni, Al, Si, Ru, Rh, Pd, Os, Ir, Pt, Mn, and Cu is added to be contained in an amount of down to 0.1 at. % based on the total amount of elements of the first group because the amorphousness is increased. If the content is over 20 at. %, the hardness is deteriorated, and the slide durability as a whole is deteriorated on the contrary, so that it is desirable that the amount to be added is from down to 0.1 at. % to up to 20 at. %. Both the fine mixed crystal protective coating layer and the amorphous protective coating layer have advantages that they are dense and good in adhesion to the magnetic layer, are hardly peeled off from the interface, are rich in absorption since they have many unsaturated atoms on the surface, and are good in adhesion of a liquid lubricant.

Further, a material more excellent in corrosion resistance (e.g., $(Hf_{0.4}Zr_{0.5}Si_{0.1})_{0.34}O_{0.66}$, and $(Zr_{0.5}Nb_{0.5})_{0.5}O_{0.5})$, and a material more excellent in slide durability (e.g., $(W_{0.5}Mo_{0.5})_{0.5}C_{0.5}$, and $(Zr_{0.5}Nb_{0.5})_{0.5}N_{0.5})$ may be layered, or a material more excellent in slide durability, a material more excellent in corrosion resistance, and a material more excellent in adhesivity (e.g., $(W_{0.5}Nb_{0.5})_{0.5}C_{0.5}$, and $(Cr_{0.5}Zr_{0.4}Si_{0.1})_{0.5}B_{0.5})$ may be layered to form a protective coating layer having a multi-layer structure, and this is particularly preferable because the advantages of the individual layers are exhibited effectively.

As described above, it has become apparent that a protective film having excellent properties that cannot be obtained by a single material can be obtained by including two or more of Ti, Zr, Hf, V, Nb, Ta, Cr, Mo, and W. Compositions of the above elements will now be further described in more detail.

Figure 2:
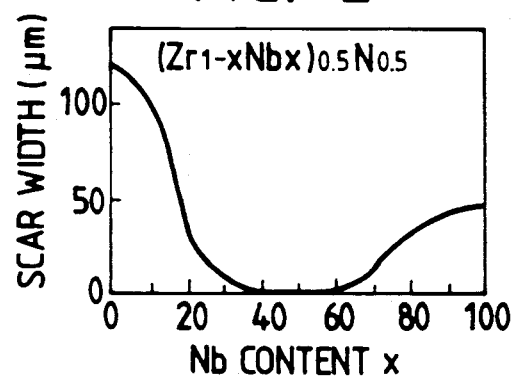
FIG. 2 is a chart showing a relationship between the alloy composition of the protective coating film and the wear resistance of the magnetic disk.

As the structure is shown in FIG. 1, by the RF magnetron sputtering method, each Al-Mg alloy substrate (11), having a diameter of 130 mm, and plated with Ni-P to form an electrodeposit having a thickness of from 5 to 10 μm to have circumferentially, on the surface, projections having a center line average surface roughness of 10 nm, was formed with Cr primary (12, 12') each having a thickness of 350 nm, and $Co_{0.5\text{-}6}Ni_{0.40}Zr_{0.04}$ magnetic layers (13, 13') each having a thickness of 70 nm with the substrate temperature being 100° C., the argon gas pressure being 15 mTorr, and the input electric power density being 1 W/cm$^2$ $(Zr_{1-x}Nb_x)_{0.5}N_{0.5}$ protective coating layers (14, 14') were further formed each having a thickness of 40 nm with the pressure of the gas mixture made up of 50 vol. % of argon gas, and 50 vol. % of nitrogen gas being 10 mTorr, and the input electric power density being 3 W/cm$^2$ thereby forming a magnetic disk. The wear resistance was assessed. The assessment was carried out in such a manner that a sapphire spherical sliding pin having a curvature of 30 mm was pressed to the magnetic disk under a load of 10 gf, the magnetic disk was rotated at a relative speed of 10 m/s, and after 3600 slide movements, the abrasion loss and the scar width of the magnetic disk were measured. The protective coating layers assessed were different in the content ratio of Zr and Nb, and had a nitrogen content of 50 at. %. When Nb is added in an amount of from 0.1 at. % to up to 99.9 at % to Zr, the abrasion speed decreased to ¼ or below of that cases of the nitrides of Zr only and Nb only. Also the state of abrasion was changed from uniform abrasion to an aggregate of fine linear scratches, so that it was confirmed that the addition of Nb improved the sliding endurance. The average width of the aggregate of fine linear scratches for the Nb composition is shown in FIG. 2. It can be understood that, assuming the total amount of Zr, and Nb to be 100 at. %, addition of 20 at. % or more of Nb makes the scar width remarkably small, and addition of 80 at. % or more of Nb makes the scar width remarkably large. In other words, it is preferable that the content of Nb is from 20 at. % to up to 80 at. %. It is more preferable that the content of Nb is from 30 at. % to up to 70 at. % because the scar width is made smaller, and it is particularly preferable that the content of Nb is from 40 at. % to up to 60 at. % because then the scar width is almost zero. When a $(Zr_{1-x}Nb_x)_{0.5}N_{0.5}$ film thickness of 0.1 μm was formed on a glass substrate, and the crystallinity was examined through an X-ray, a peak showing the crystal orientation was not observed in the case when the amount of Nb was small, while a remarkable peak showing the crystallinity was observed at the position of 39° at 2 θ of the diffraction pattern by an X-ray diffractometer in the case when the amount of Nb was 30 at. % or more. Thereby it was confirmed that a different phase of Nb$_2$N or the like was deposited. Thus it is considered that the sliding endurance was improved. At least one of Y, Mg, Ca, Sc, Fe, Co, Ni, Al, Si, Ru, Rh, Pd, Os, Ir, Pt, Mn, and Cu is added to be contained in an amount of from down to 0.1 at. % to up to 20 at. % for the total amount of Zr, and Nb, the crystal grains became fine, the film structure became uniform, and the corrosion resistance and the sliding endurance were improved twice or more. When the added amount was more than 20 at. %, the hardness decreased, while when the added amount was less than 0.1 at. %, the effect of fining the grains was small. Further, when other combinations of two elements of Zr, Nb, Ti, Hf, V, Ta, Cr, Mo, and W (i.e., combinations other than the combination of Zr, and Nb), were tested results similar to the above results were obtained. Further, when instead of the nitride for the protective coating film, the carbide, oxide, or boride was used, results similar to the above results were obtained.

In the above, although, as the substrate, an Al alloy plated with Ni-P was used, an Al alloy subjected to alumilite treatment may be used, and materials generally used as a substrate of magnetic disks can be used in the present invention. In the case of a glass substrate, the surface is not required to be plated. Although in many cases a primary layer of Cr or the like is provided in order to improve the coercive force of the magnetic layer, it is not always necessary, and it can be omitted. In the case of longitudinal magnetization, Cr is, for example, used, and in the case of perpendicular magnetization, Ti is, for example, used.

Figure 3:
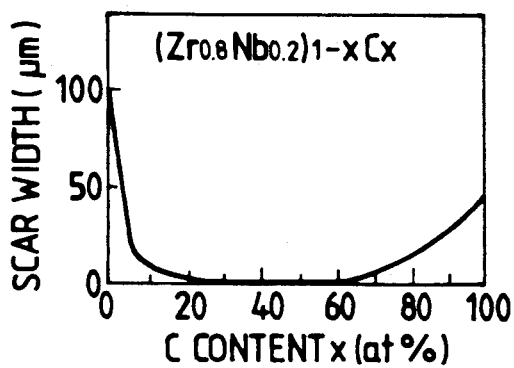
FIG. 3 is a chart showing the relationship between the amount of C of a $(Zr_{0.8}Nb_{0.2})_{1-x}C_x$ protective coating film and the wear resistance of the magnetic disk.

Now, the composition dependency of nitrogen, carbon, oxygen, boron, etc. will be described. FIG. 3 shows the assessment carried out for $(Zr_{0.8}Nb_{0.2})_{1-x}C_x$ similarly to the assessment shown in FIG. 2. If C is contained even in an small amount, the abrasion loss and the scar width sharply decrease, whereas if C is contained in a large amount, the scar width increases. Therefore it is preferable that the content of C is from 1 at. % to up to 90 at. %. If importance is attached to the smallness of scar width, it is preferable that the content of C is from 10 at. % to up to 80 at. %, and it is more preferable that the content of C is from 40 at. % to up to 60 at. % because the scar width becomes almost zero. In addition, C is contained in the target. Further, in the case when other combinations of two elements of Zr, Nb, Ti, Hf, V, Ta, Cr, Mo, and W (i.e., combinations other than the combination of Zr, and Nb) were used, results similar to the above results were obtained.

In the case of the carbides, when as in the case of W-Mo-C type carbides, and W-Nb-C type carbides the crystal structure of the hexagonal lattice is dominant, or the amorphous structure is dominant, the adhesion to the magnetic layer is particularly excellent, so that such a combination is preferable in comparison with the case where other crystal structures are dominant. When the nitride, oxide, or boride was used instead of the carbide for the protective coating film, results similar to the above results were obtained. When 0.1 to 30 vol. % of $N_2$, $H_2$ or $O_2$ were included in the gas at the time when the sputtering CVD was effected, the formed film contained 1 to 90 at. % of N, H, or O, and results similar to the above results were obtained.

Figure 4:
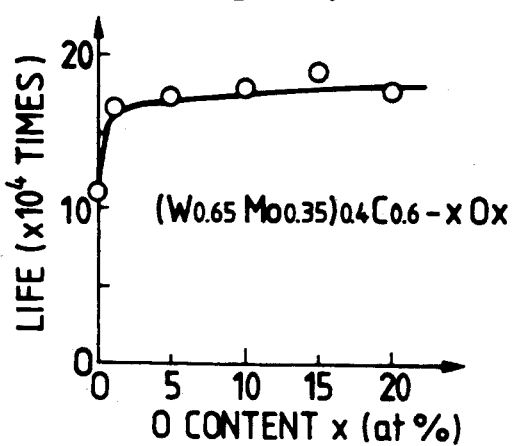
FIG. 4 is a chart showing the relationship between the amount of O of a $(W_{0.65}Mo_{0.35})_{0.4}C_{0.6-x}O_x$ protective coating film and the wear resistance of the magnetic disk.
Figure 5:
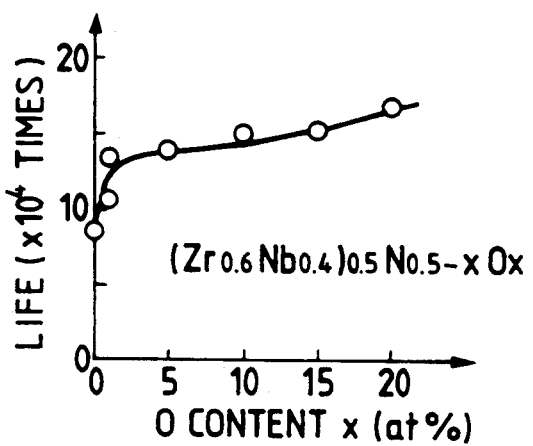
FIG. 5 is a chart showing the relationship between the amount of O of a $(Zr_{0.6}Nb_{0.4})_{0.5}N_{0.5-x}O_x$ protective coating film and the wear resistance of the magnetic disk.

FIG. 4 shows results of an assessment similar to the above assessment made for $(W_{0.65}Mo_{0.35})_{0.4}C_{0.6-x}O_x$, wherein the strength was assessed in terms of the pass number required for the complete destruction of the protective coating film to expose the magnetic layer. According to this assessment, it can be understood that when O is contained in an amount of 1 at. % or more in $(W_{0.65}Mo_{0.35})_{0.4}C_{0.6}$, the strength is remarkably increased. This is considered as a result of remarkable improvement of the adhesion to the magnetic film due to the enhancement of the effect of producing fine crystal grains caused by the inclusion of two or more elements of the second group consisting of N, C, O, and B. FIG. 5 shows results of an assessment similar to the above assessment made for $(Zr_{0.6}Nb_{0.4})_{0.5}N_{0.5-x}O_x$. In this case also, it is particularly preferable that O is additionally contained in an amount of 1 at. % or over in $(Zr_{0.6}Nb_{0.4})_{0.5}N_{0.5}$ because the strength is also remarkably increased. In other words, it is particularly preferable that two or more of elements of the first group are contained, and two or more of elements of the second group consisting of N, C, O, and B are contained.

It is preferable that the thickness of the above nonmagnetic protective coating layer is from 5 nm to up to 60 nm. This is because if the protective coating layer has a thickness smaller than 5 nm, the protective coating layer does not contribute enough to improve the durability of the recording medium, whereas if the protective coating layer has a thickness greater than 60 nm, the distance between the magnetic layer and the magnetic head is unnecessarily increased thereby lowering the recording/reproducing characteristics. In order to enhance the recording/reproducing characteristics, and secure practical strength, it is preferable that the thickness of the protective coating layer is from 10 nm to up to 40 nm, and more preferably from 20 nm to up to 30 nm.

It is also effective to provide a nonmagnetic intermediate metal layer between the above nonmagnetic protective coating layer and the magnetic layer to improve endurance, and corrosion resistance of the recording medium. It has been found that corrosion resistance of the recording medium, and the adhesion of the protective coating layer are particularly improved by composing said nonmagnetic intermediate metal layer of an alloy containing as major component at least one element selected from the third group consisting of Ti, Zr, Hf, Nb, and Ta, and from 0.01 at. % to up to 1 at. % of at least one element selected from the fourth group consisting of Pt, Pd, Rh, Ir, Ru, and Os. The intermediate layer could alternatively be comprised of from down to 0.1 wt. % to up to 1 wt. % of at least one element selected from the fifth group consisting of Mo, and Ni, or an Ni alloy containing from 1 wt. % to up to 40 wt. % of at least one element selected from the sixth group consisting of Ti, V, Nb, Ta, Cr, Mo, W, Mn, Fe, Co, Cu, Al, and Si, and desirably from down to 27 wt. % to up to 34 wt. % of Cu, or an Ni alloy containing from 2 wt. % to up to 32 wt. % of Mo, and from 13 wt. % to up to 25 wt. % of Cr. The reason for the improvement of the corrosion resistance is that the elements of the third group consisting of Ti, Zr, Hf, Nb, and Ta are active to oxygen, and are liable to form a dense passivation film, and the addition of elements of the fourth group consisting of Pt, Pd, Rh, Ir, and Ru facilitates the oxidation and passivation of the film surface, and the highest corrosion resistance was recognized when an alloy comprising of at least one element of the third group and at least one element of the fourth group was used. Similarly, in the case when Ni is used as major component, the reason for the improvement is that a uniform and dense passivation film is liable to be formed on the surface, and the effect is facilitated by the inclusion of Cu, Mo, and Cr. The reason for the improvement of the adhesion of the protective coating layer is that since said nonmagnetic intermediate metal layer is chemically active, the nonmagnetic intermediate metal layer reacts chemically with the magnetic layer and the protective coating layer at the surfaces to bond firmly. In comparison with other protective films such as a C film, these nonmagnetic intermediate metal layer materials are high in bonding adhesion to the present protective film, and particularly excellent corrosion resistance can be secured.

Now, compositions of the above elements will be further described in more detail. When elements of the third group consisting of Ti, Zr, Hf, Nb, and Ta, and the fourth group consisting of Pt, Pd, Rh, Ir, Ru, and Os are added to the intermediate layer, a stable passivation film is formed on the intermediate layer surface, and therefore the corrosion resistance of the magnetic disk is improved. This results from the addition of elements that promote the reduction reaction of oxygen and hydrogen ions at the intermediate surface to facilitate the passivation, and this effect is low if the added amount is less than 0.01 at. %, whereas if the added amount is over 1 at. %, it is not desirable because the intermediate layer is liable to be oxidized, which results, on the contrary, in the deterioration of the action. Similarly, the addition of Mo, and Ni respectively in the range of from 0.1 to up to 1 wt. % is very effective in improving resistance to corrosion by dust.

In the case where Ni is used as major component, the formation of a stable passivation film on the intermediate layer surface is obtained by the inclusion of at least one element selected from the sixth group consisting of Ti, V, Nb, Ta, Cr, Mo, W, Mn, Fe, Co, Cu, Al, and Si in an amount of from 1 wt. % to up to 40 wt. % for Ni. If the added amount of said at least one element selected from the sixth group is 1 wt. % or below, a satisfactory passivation film is not formed, there is no resulting improvement of the corrosion resistance. On the other hand, if the added amount is 40 wt. % or over, the intermediate layer surface becomes too susceptible to oxidation, and the action is undesirably deteriorated. In other words, it is desirable that at least one element selected from the sixth group consisting of Ti, V, Nb, Ta, Cr, Mo, W, Mn, Fe, Co, Cu, Al, and Si is added in an amount of from 1 wt. % to up to 40 wt. % for Ni. In particular, to allow the passivation film to be present stably, it is desirable to contain Cu in an amount of from 27 wt. % to up to 34 wt. %, Mo in an amount of from 2 wt. % to up to 32 wt. %, and Cr in an amount of from 13 wt. % to up to 25 wt. %. If the added amount of Cu is 27 wt. % or below, a satisfactory passivation film is not formed, and therefore there is no effective improvement in corrosion resistance, whereas if the added amount of Cu is 34 wt. % or over, the intermediate layer surface becomes too susceptible to oxidation, and that is not desirable because the action is deteriorated. In other words, it is desirable that the amount of Cu to be added is from down to 27% wt. % to up to 34 wt. %. When the added amount of Mo is 2 wt. % or below, a satisfactory passivation film is not formed, and therefore there is no effective improvement of the corrosion resistance, whereas if the added amount of Mo is 32 wt. % or over, the intermediate layer surface becomes too susceptible to oxidation, and that is not desirable because the action is deteriorated. In other words, the amount of Mo to be added is from 2 wt. % to up to 32 wt. %. Further, if the added amount of Cr is 13 wt. % or below, a satisfactory passivation film is not formed, and therefore there is no effective improvement of the corrosion resistance, whereas if the added amount of Cr is 25 wt. % or over, the intermediate layer becomes too susceptible to oxidation, and therefore that is not desirable because the action is deteriorated. In other words, it is desirable that the amount of Cr to be added is from 13 wt. % to up to 25 wt. %.

Figure 6:
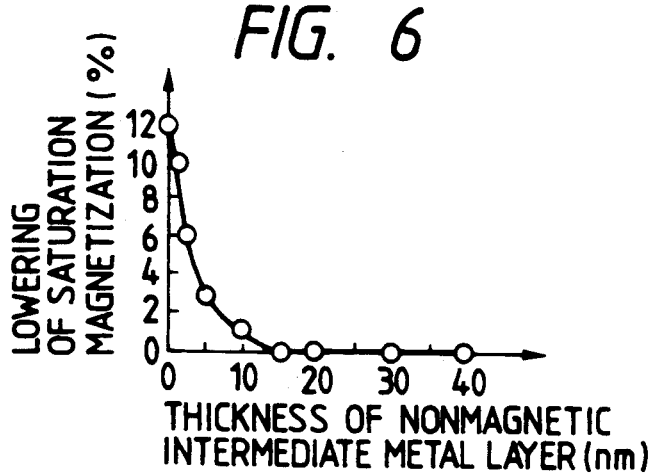
FIG. 6 is a chart showing the relationship between the thickness of an $Zr_{0.995}Pt_{0.005}$ nonmagnetic intermediate metal layer and the corrosion resistance.
Figure 7:
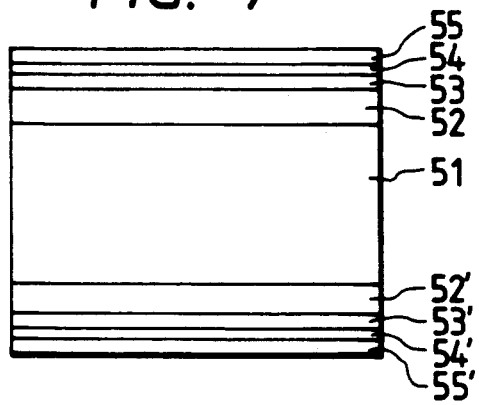
FIG. 7 is a sectional view of the magnetic disk of Example 6.

As shown in FIG. 7, by the RF magnetron sputtering method, on Al-Mg alloy substrate 51, having a diameter of 130 mm and plated with Ni-P to have circumferential projections having a center line average surface roughness of 10 nm on the surface, were formed primary layers 52, 52' each having a thickness of 350 nm, magnetic layers 53, 53' made of $Co_{0.56}Ni_{0.40}Zr_{0.04}$ and each having a thickness of 70 nm. Thereon nonmagnetic intermediate metal layers 54, 54' made of $Zr_{0.995}Pt_{0.005}$ having thicknesses of 1 nm, 2 nm, 5 nm, 10 nm, 15 nm, 20 nm, 30 nm, and 40 nm respectively, were formed with the substrate temperature being 100° C., the argon gas pressure being 15 mTorr, and the input electric power density being 1 W/cm². Nonmagnetic protective coating layers 55,55' made of $(Zr_{0.5}Nb_{0.5})_{0.5}N_{0.5}$ and each having a thickness of 30nm were formed, with the pressure of a mixed gas of 50 vol % of argon and 50 vol % of nitrogen being 10 mTorr, and the input electric power density being 3 W/cm², to complete the magnetic disks. To assess the corrosion resistance, the magnetic disks were subjected to an NaCl spray test using an aqueous solution of 1 mol of NaCl/l at 50° C. for 64 hours, and the results are shown in FIG. 6. In the case of the magnetic disk having no nonmagnetic intermediate metal layers 54, 54' made of $Zr_{0.995}Pt_{0.005}$, the saturation magnetization Ms was reduced by 12% after 64 hours of the NaCl spray test, whereas, as is shown in FIG. 6, when the thickness of the nonmagnetic intermediate metal layer was 2 nm or over, the reduction in Ms lowered, and when the thickness was 15 nm or over, the reduction in Ms was not recognized at all. When the thickness of the above nonmagnetic intermediate metal layer is below 2 nm, it is not effective in improving the corrosion resistance, whereas when the thickness is over 15 nm, although the corrosion resistance is good, the distance between the magnetic layer and the magnetic head is increased unnecessarily, and it is unfavorable because the recording/reproducing characteristics are lowered. Therefore, it is preferable that the thickness of the above nonmagnetic intermediate metal layer is from 2 nm to up to 15 nm, and if importance is attached more to the recording/reproducing characteristics, it is the most preferable that thickness is from 5 nm to up to 10 nm.

When the nonmagnetic intermediate metal layer was composed of Ni as major component, and contained at least one element selected from the sixth group consisting of Ti, V, Nb, Ta, Cr, Mo, W, Mn, Fe, Co, Cu, and Si, results similar to the above results were obtained.

Now, the present invention that uses composite magnetic thin films will be described in detail. In this case, the effects mentioned above depend on the following actions.

Magnetic metals such as Co, Fe, Ni, Gd, and Tb, particularly Co, Fe, Ni, and Gd can be magnetized at ordinary temperatures. When these metals or their alloys containing Ti, Zr, Hf, V, Nb, Ta, Cr, Mo, or W in an amount of 3 at. % or over are formed into a thin film by physical vapor deposition, such as the sputtering method, the film is amorphous or is made up of an aggregate of fine crystals.

Figure 12:
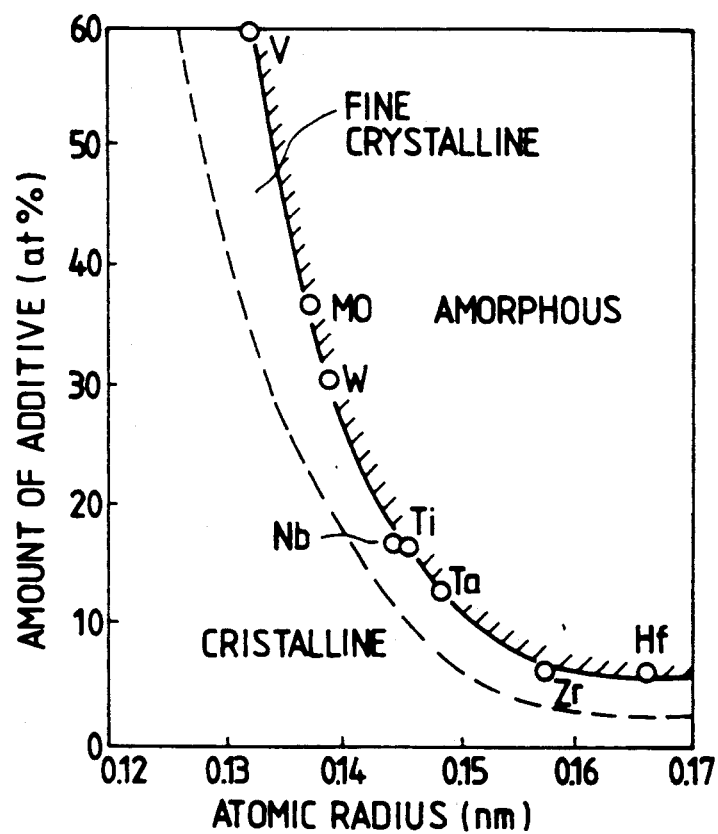
FIG. 12 is a constitutional diagram showing the crystallinity in the case when various elements are added to Co.

FIG. 12 shows a constitutional diagram of the case wherein V, Mo, W, Nb, Ti, Ta, Zr, or Hf is added to Co. With respect to Zr, and Hf, when the added amount is 3 at. % or over, desirably 5 at. % or over, the film becomes amorphous, or is made of very fine crystals, and the hardness of the film becomes higher in comparison with that of the usual crystalline state. However, since when the added amount is over 60 at. %, the magnetization disappears, it is desirable that the amount to be added is up to 60 at. %, and more desirably up to 50 at. %. Results similar to the above results were observed in the case when a thin film was formed by carrying out sputtering in Ar gas containing 5 to 95 vol. % of nitrogen, oxygen, or the like during the formation of the film, or by using a material obtained adding 6 at. % or over of C, B, Si, N, or O to the above alloy, and in the case when, in addition to Zr, or Hf, V, Mo, W, Nb, Ti, or Ta was added to Co in an amount of 3 at. % or over, and more desirably 5 at. % or over, the film was amorphous or very fine crystalline.

If the added amount exceeds 80 at. %, the magnetization disappears. Thus, it is desirable that the amount to be added is up to 80 at. %, and more desirably up to 60 at. %. This phenomenon was observed not only in the case of Co, but also in the case of Fe, Ni, and Gd. Thus, it is preferable for sliding endurance to provide C, B, Si, N, or O or the composite thereof contained in an alloy containing at least one element selected from Co, Fe, Ni, and Gd, and at least one element selected from V, Mo, W, Nb, Ti, Ta, Zr, and Hf, since the film becomes very fine crystalline, or amorphous, and the hardness becomes quite high, it is quite preferable in view of the sliding endurance. This is considered to be due to the formation of a high-melting point and highly hard compound by the reaction of V, Mo, W, Nb, Ti, Ta, Zr, or Hf with C, B, Si, N, or O. This composite effect is remarkable when the amount to be added is 20 at. % or over. As an additive element, N, C, B or Si is desirable because the effect is high.

However, although the above magnetic alloy shows high sliding endurance, the coercive force is generally smaller than several tens Oe, and in some cases since the above magnetic alloy shows such soft magnetic properties that the coercive force is several Oe or below as shown in Japanese Patent Laid-Open 27941/1983, it is unpreferable to use the particular magnetic film itself for a magnetic recording medium as it is.

The present inventors have studied intensively to make a good use of the high sliding endurance of the above first magnetic film, and to enhance the magnetic properties, and have, found that recording/reproducing with high recording density becomes possible; when, under said first magnetic film, there is provided a high magnetic property magnetic film having a coercive force on the order of 1000 Oe to bond magnetically to said first magnetic film, and reversal of magnetization is integrally caused with the same coercive force Hc against the external magnetic field, since said coercive force is made relatively high to the extent of several hundreds Oe in comparison with the first magnetic film. If the thickness of the first magnetic layer low in coercive force is greater than 100 nm, the coercive force of the composite film is as low as about 100 Oe, and therefore high recording density cannot be attained, so that it is preferable that the thickness of the first magnetic layer is up to 100 nm, and more desirably up to 70 nm. Further, if the thickness is below 5 nm, it is unpreferable because the sliding endurance is remarkably deteriorated, and it is preferable that the thickness is no less than 5 nm, and more desirably 10 nm. In order to enhance the sliding endurance, a nonmagnetic protective film, for example, of C, ZrC, ZrN, HfN, HfC, or $ZrO_2$ may be provided on the first magnetic thin film, but it is preferable that such a nonmagnetic protective film is not provided in view of the recording/reproducing characteristics, and in this case, it is preferable that an organic lubricating layer made, for example, of a perfluoroalkylpolyether having a thickness on the order of 2 to 20 nm is provided particularly on the first magnetic layer with a view to enhancing the sliding endurance. By using a magnetic recording medium having this composite magnetic film and a magnetic head, an optical head, etc., a mass magnetic storage wherein spacing loss is reduced can be provided.

In the present magnetic recording medium in the case of using a nonmagnetic protective coating layer, and in the case using a protective coating layer of a magnetic alloy (i.e. in the case using a composite magnetic thin film), prior production techniques, e.g., sputtering, can be used, except that the constitution of the protective coating is made as described above.

DESCRIPTION OF THE PREFERRED EMBODIMENTS

Example 1

FIG. 1 is a sectional view showing the magnetic recording medium of this Example. In FIG. 1, reference numeral 11 indicates a substrate, for example, of a tempered glass, plastic, Al-alloy plated with Ni-P. 12, 12' indicate metal primary layers, for example, of Cr, Mo, W, Cr-Ti, Cr-Si, or Cr-W. 13, 13' indicate magnetic layers of Co-Ni, Co-Ni-Zr, or Co-Cr, and 14, 14' indicate nonmagnetic protective coating layers composed of at least two elements selected from the group consisting of Ti, Zr, Hf, V, Nb, Ta, Cr, Mo, and W, and at least one element selected from the group consisting of N, C, O, and B. An organic lubricating layer may be provided on each nonmagnetic protective coating layer. This Example will now be described in more detail below.

By the RF magnetron sputtering method, on a Al-Mg alloy substrate having a diameter of 130 mm and plated with Ni-P to have an electrodeposit having a thickness of 5 to 10 $\mu$m and circumferential projections having a center line average surface roughness of 10 nm on the surface, were formed Cr layers 12,12' having a thickness of 300 nm, and $Co_{0.6}Ni_{0.35}Zr_{0.05}$ layers 13,13' having a thickness of 70 nm with the substrate temperature being 100° C., the argon gas pressure being 15 mTorr, and the input electric power density being 1 W/cm$^2$. Then nonmagnetic protective coating layers shown in Table 1 were formed to have a thickness of 30 nm by the reactive sputtering method using a DC magnetron with the substrate temperature being 100° C., the pressure of a mixed gas of 50 vol. % of argon gas, and 50 vol. % of nitrogen gas being 10 mTorr, and the input electric power density being 5 W/cm$^2$, and lubricant layers of the perfluoroalkylpolyether having as the end group ester group having a thickness of 4 nm were formed thereon, thereby finishing the production of the magnetic disk. A plurality of disks were produced by this method for testing.

TABLE 1

| Sample No. | Nonmagnetic protective coating layer | Scar width ($\mu$m) |
|---|---|---|
| Example | | |
| 1 | $(Zr_{0.5}Nb_{0.5})_{0.5}N_{0.5}$ | 0 |
| 2 | $(Zr_{0.5}Ta_{0.5})_{0.5}N_{0.5}$ | 20 |
| 3 | $(W_{0.95}Zr_{0.05})_{0.5}N_{0.5}$ | 5 |
| 4 | $(Zr_{0.5}Cr_{0.5})_{0.5}N_{0.5}$ | 30 |

TABLE 1-continued

| Sample No. | Nonmagnetic protective coating layer | Scar width (μm) |
|---|---|---|
| 5 | $(W_{0.98}Mo_{0.02})_{0.5}N_{0.5}$ | 5 |
| 6 | $(Zr_{0.5}V_{0.5})_{0.5}N_{0.5}$ | 40 |
| 7 | $(Zr_{0.5}Ti_{0.4}Al_{0.1})_{0.5}N_{0.5}$ | 50 |
| 8 | $(Zr_{0.5}Hf_{0.4}Si_{0.1})_{0.5}N_{0.5}$ | 20 |
| Comparative example 1 | $Zr_{0.5}N_{0.5}$ | 120 |

The magnetic disks were immersed in a hydrocarbon polyhalide, i.e., so-called Freon (trade name) to try to remove the lubricant, but the adsorbed lubricant could not be removed because the lubricant was adsorbed firmly. A sapphire spherical sliding pin having a curvature of 30 mm was pressed to the magnetic disk under a load of 10 gf, the magnetic disk was rotated at a relative speed of 10 m/s, and after 5000 slide movements, the scar width formed on the magnetic disk were measured to assess the strength of the magnetic disk. As shown in Table 1, the magnetic disks in this Example showed a strength twice or more as high as that of the Comparative Example, and in particular in the case of $(Zr_{0.5}Nb_{0.5})_{0.5}N_{0.5}$, no scars were observed at all. The WN series also showed good characteristics.

Further, when the above spherical sliding test was continued until the protective film surface was completely destroyed and the magnetic layer was exposed, all the magnetic disks in this Example showed good sliding endurance in comparison with the Comparative Example whose protective film was completely destroyed when the number of the slide movements reached 15,000. In particular, the $(Zr_{0.5}Nb_{0.5})_{0.5}N_{0.5}$, $(W_{0.95}Zr_{0.05})_{0.5}N_{0.5}$, and $(W_{0.98}Mo_{0.02})_{0.5}N_{0.5}$ did not expose the magnetic layer, and showed higher sliding endurance until the number of the slide movements reached 200,000. In the test wherein a sapphire spherical sliding pin having a curvature of 30 mm was pressed to the magnetic disk under a load of 10 gf, and was reciprocated 30 times in a second with the amplitude being 500 μm, with respect to the time at which the protective coating layer was suddenly abraded, the $Zr_{0.5}N_{0.5}$ required 2 min, which was short, whereas the $(Zr_{0.5}Nb_{0.5})_{0.5}N_{0.5}$ required 25 min or more, showing that the endurance of the latter is 10 times or more as high as that of the former. In the formation of the film, when nitrogen was mixed with Ar in an amount of 10 to 100 vol. % instead of 50 vol. % results similar to the above results were obtained. When, as the target material, a nitride target was used, results similar to the above results were obtained. Using the same alloys as those of the Example shown in Table 1, oxynitrides were formed by carrying out the sputtering in an Ar/N₂ mixed gas containing 0.1 to 50 vol. % of oxygen. The impact resistance was further improved twice or more, and therefore particularly high sliding endurance dependency was secured.

Example 2

Now, another Example will be described using magnetic disks having the structure shown in FIG. 1.

By the RF magnetron sputtering method, on Al-Mg alloy substrates, having a diameter of 130 mm and plated with Ni-P to have circumferential projections having a center line average surface roughness of 5 nm on the surface, were formed Cr layers having a thickness of 250 nm, and $Co_{0.6}Ni_{0.35}Hf_{0.05}$ layers having a thickness of 70 nm with the substrate temperature being 150° C., the argon gas pressure being 10 mTorr, and the input electric power density being 1 W/cm². Then nonmagnetic protective coating layers shown in Table 2 were formed to have each a thickness of 20 nm by the reactive sputtering method using a RF magnetron with the substrate temperature being 100° C., the pressure of a mixed gas of 50 vol. % of argon gas, and 50 vol. % of nitrogen gas being 10 mTorr, and the input electric power density being 2 W/cm². Lubricant layers of a perfluoroalkylpolyether having as the end group OH group having a thickness of 5 nm were then formed to finish production of the magnetic disks. Using this method, a plurality of disks were produced for testing.

TABLE 2

| Sample No. | Nonmagnetic protective coating layer | Scar width (μm) |
|---|---|---|
| Example | | |
| 9 | $(Hf_{0.5}Nb_{0.4}Al_{0.1})_{0.34}O_{0.66}$ | 10 |
| 10 | $(Hf_{0.5}Ta_{0.4}Al_{0.1})_{0.34}O_{0.66}$ | 10 |
| 11 | $(Hf_{0.5}V_{0.5})_{0.34}O_{0.66}$ | 20 |
| 12 | $(Hf_{0.5}Cr_{0.45}Mg_{0.05})_{0.34}O_{0.66}$ | 5 |
| 13 | $(Hf_{0.5}Mo_{0.5})_{0.34}O_{0.66}$ | 5 |
| 14 | $(Hf_{0.5}W_{0.5})_{0.34}O_{0.66}$ | 10 |
| 15 | $(Hf_{0.5}Ta_{0.4}Y_{0.1})_{0.34}O_{0.66}$ | 5 |
| 16 | $(Hf_{0.4}Zr_{0.5}Si_{0.1})_{0.34}O_{0.66}$ | 0 |
| Comparative example 2 | $Hf_{0.34}O_{0.66}$ | 80 |
| | $ZrO_2$ | 90 |

The magnetic disks were subjected to a spherical sliding test by using a sapphire spherical sliding pin having a curvature of 30 mm under a load of 10 gf with the relative speed being 10 m/s. The scar widths on all the magnetic disks after 5,000 slide movements were very small as shown in Table 2 in comparison with the Comparative Example, showing good wear resistance of the magnetic disks of this Example. In particular, in the example containing Zr, no scar was not observed at all. The adhesion of these protective films was high in comparison with prior protective films of, for example, C, Rh, or $SiO_2$, and the protective films were scarcely peeled off by the scratching test using a diamond needle.

Example 3

Now, another Example will be described using magnetic disks having the structure shown in FIG. 1.

By the RF magnetron sputtering method, on Al-Mg alloy substrates, having a diameter of 51 mm and plated with Ni-P to have circumferential projections having a center line average surface roughness of 12 nm on the surface, were formed Cr layers having a thickness of 350 nm, and $Co_{0.85}Cr_{0.1}Zr_{0.05}$ layers having a thickness of 40 nm with the substrate temperature being 100° C., the argon gas pressure being 15 mTorr, and the input electric power density being 3 W/cm². Then nonmagnetic protective coating layers shown in Table 3 were formed to have a thickness of 40 nm by the DC magnetron sputtering method using carbide alloy targets with the substrate temperature being 150° C., the argon gas pressure being 10 mTorr and the input electric power density being 6 W/cm², thereby finishing production of the magnetic disks. Using this method, a plurality of disks were produced for testing purposes.

TABLE 3

| Sample No. | Nonmagnetic protective coating layer | Scar width (μm) |
| --- | --- | --- |
| Example | | |
| 17 | $(Ti_{0.5}Nb_{0.5})_{0.5}C_{0.5}$ | 10 |
| 18 | $(Ti_{0.5}Ta_{0.5})_{0.5}C_{0.5}$ | 20 |
| 19 | $(Ti_{0.5}V_{0.3}Si_{0.2})_{0.5}C_{0.5}$ | 5 |
| 20 | $(Ti_{0.5}Cr_{0.5})_{0.5}C_{0.5}$ | 10 |
| 21 | $(Ti_{0.5}Mo_{0.5})_{0.5}C_{0.5}$ | 5 |
| 22 | $(Ti_{0.5}Zr_{0.5})_{0.5}C_{0.5}$ | 0 |
| 23 | $(Ti_{0.5}Hf_{0.5})_{0.5}C_{0.5}$ | 0 |
| 24 | $(W_{0.5}Ti_{0.4}Si_{0.1})_{0.5}C_{0.5}$ | 5 |
| 25 | $(W_{0.99}Zr_{0.01})_{0.5}C_{0.5}$ | 0 |
| 26 | $(W_{0.99}Hf_{0.01})_{0.5}C_{0.5}$ | 0 |
| 27 | $(W_{0.9}Nb_{0.1})_{0.5}C_{0.5}$ | 5 |
| 28 | $(W_{0.9}Ta_{0.1})_{0.5}C_{0.5}$ | 5 |
| 29 | $(W_{0.9}V_{0.1})_{0.5}C_{0.5}$ | 0 |
| 30 | $(W_{0.99}Cr_{0.01})_{0.5}C_{0.5}$ | 5 |
| 31 | $(W_{0.99}Mo_{0.01})_{0.5}C_{0.5}$ | 0 |
| Comparative example 3 | $Ti_{0.5}C_{0.5}$ | 95 |

The magnetic disks were subjected to a spherical sliding test by using a sapphire spherical sliding pin having a curvature of 30 mm under a load of 10 gf with the relative speed being 10 m/s. The scar widths on all the magnetic disks after 5,000 slide movements were very small as shown in Table 3 in comparison with the Comparative Example, showing good wear resistance of the magnetic disks of this Example. The effect in the case containing Zr, or Hf was high, and the effect in the case containing a large amount of W was particularly high.

Lubricating layers having a thickness of 5 nm and made of a perfluoroalkylpolyether having as the end group a benzene ring were formed on the disk surfaces shown in Table 3, and the disks were subjected to the spherical sliding test under the above conditions. All the disks showed good sliding endurance in comparison with the Comparative Example. In particular, after 200,000 slide movements any scar was not observed at all in the $(W_{0.99}Mo_{0.01})_{0.5}C_{0.5}$, showing particularly high sliding endurance. In this Example, although the thickness of the $(W_{0.99}Mo_{0.01})_{0.5}C_{0.5}$ was 40 nm, it was also confirmed that if the thickness was 20 nm, the sliding endurance was scarcely deteriorated.

Although herein the protective coating layers were formed by using a carbide alloy target, a metal alloy target may be used, and the sputtering may be carried out in a mixed gas obtained by mixing Ar with a hydrocarbon gas such as $C_2H_2$, and $CH_4$.

For the nonmagnetic protective coating layer consisting of C and a combination of two elements selected from the first group, it is preferable to use, in addition to the above combinations of metal elements, combinations of Ti-V, Ti-Nb, Ti-Cr, Ti-Mo, Zr-Hf, Zr-Nb, Zr-Ta, Zr-Cr, Zr-Mo, Zr-W, Hf-Nb, Hf-Ta, Hf-Cr, Hf-Mo, Hf-W, V-Nb, V-Ta, V-Cr, V-Mo, V-W, Nb-Ta, Nb-Cr, Nb-Mo, Nb-W, Ta-Cr, and Ta-Mo to which C is added, and it is also possible to further add other elements of the first group, and other suitable elements.

Example 4

Still another Example will be described by using magnetic disks having the structure shown in FIG. 1.

By the RF magnetron sputtering method, on glass substrates having a diameter of 89 mm and formed with circumferential projections 5 nm in size on the surface, were formed Cr layers having a thickness of 420 nm, and $Co_{0.55}Ni_{0.35}Zr_{0.05}Cr_{0.05}$ layers having a thickness of 60 nm with the substrate temperature being 100° C., the argon gas pressure being 5 mTorr, and the input electric power density being 1 W/cm², then nonmagnetic protective coating layers shown in Table 4 were formed by the RF magnetron sputtering method to have a thickness of 10 mm with the substrate temperature being 150° C., the argon gas pressure being 2 mTorr, and the input electric power density being 5 W/cm², and then layers of a perfluoroalkylpolyether having a thickness of 7 nm were formed, thereby producing magnetic disks.

TABLE 4

| Sample No. | Nonmagnetic protective coating layer | Scar width (μm) |
| --- | --- | --- |
| Example | | |
| 32 | $(Cr_{0.5}Nb_{0.5})_{0.5}B_{0.5}$ | 3 |
| 33 | $(Cr_{0.5}Ta_{0.5})_{0.5}B_{0.5}$ | 3 |
| 34 | $(Cr_{0.5}V_{0.45}Ca_{0.05})_{0.5}B_{0.5}$ | 5 |
| 35 | $(Cr_{0.5}Mo_{0.5})_{0.5}B_{0.5}$ | 10 |
| 36 | $(Cr_{0.5}W_{0.5})_{0.5}B_{0.5}$ | 5 |
| 37 | $(Cr_{0.5}Ti_{0.5})_{0.5}B_{0.5}$ | 5 |
| 38 | $(Cr_{0.5}Zr_{0.4}Si_{0.1})_{0.5}B_{0.5}$ | 0 |
| 39 | $(Cr_{0.5}Hf_{0.50.5}B_{0.5}$ | 0 |
| Comparative example 4 | $Cr_{0.5}B_{0.5}$ | 45 |

The magnetic disks were subjected to a spherical sliding test by using a sapphire spherical sliding pin having a curvature of 30 mm under a load of 10 gf with the relative speed being 10 m/s. The scar widths on all the magnetic disks after 5,000 slide movements were very small as shown in Table 4 in comparison with the Comparative Example, showing good wear resistance of the magnetic disks of this Example. In particular, in the case containing Zr, or Hf, no scar was observed at all.

Example 5

Still another Example will be described by using magnetic disks having the structure shown in FIG. 1.

By the RF magnetron sputtering method, on Al-Mg alloy substrate, having a diameter of 130 mm and plated with Ni-P to have projections having a center line average surface roughness of 10 nm on the surface, were formed Cr layers having a thickness of 500 nm, and $Co_{0.55}Ni_{0.40}Zr_{0.05}$ layers having a thickness of 50 nm with the substrate temperature being 100° C., the argon gas pressure being 15 mTorr, and the input electric power density being 1 W/cm². Then nonmagnetic protective coating layers shown in Table 5 were formed. In Sample Nos. 40 to 44, the thickness was made to have 30 nm by the reactive sputtering method using an RF magnetron with the substrate temperature being 100° C., the pressure of a mixed gas of 50 vol. % of argon gas, and 50 vol. % of nitrogen gas being 10 mTorr, and the input electric power density being 5 W/cm², thereby producing magnetic disks. In Sample Nos. 45 and 46, the thickness was made to have 30 nm by the RF magnetron sputtering method using a carbide alloy target with the substrate temperature being 100° C., the argon gas pressure being 10 mTorr, and the input electric power density being 5 W/cm², thereby finishing the production of magnetic disks. Using this method a plurality of magnetic disks were produced for testing purposes.

TABLE 5

| Sample No. | Nonmagnetic protective coating layer | Friction coefficient $\mu$ |
| --- | --- | --- |
| Example | | |
| 40 | $(Zr_{0.5}Nb_{0.5})_{0.5}N_{0.5}$ | 1.0 |
| 41 | $(Zr_{0.5}Ta_{0.5})_{0.5}N_{0.5}$ | 2.5 |
| 42 | $(Ti_{0.5}V_{0.5})_{0.5}N_{0.5}$ | 0.8 |
| 43 | $(Ti_{0.5}Nb_{0.5})_{0.5}N_{0.5}$ | 1.1 |
| 44 | $(Ti_{0.5}Ta_{0.5})_{0.5}N_{0.5}$ | 1.1 |
| 45 | $(Zr_{0.5}Nb_{0.5})_{0.5}C_{0.5}$ | 0.6 |
| 46 | $(Zr_{0.5}V_{0.5})_{0.5}C_{0.5}$ | 0.6 |
| Comparative example 5 | C | 3.2 |

A sapphire spherical sliding pin having a curvature of 30 mm was pressed to each of the magnetic disks under a load of 10 gf, and was reciprocated 30 times in a second with the amplitude being 500 $\mu$m, and the friction coefficient between the magnetic disk and the sliding pin was measured after 1,800 reciprocations were done. The values of the friction coefficients of the magnetic disks of this Example were lower than that of the Comparative Example, showing good sliding endurance of the magnetic disks of this Example.

Further, lubricating layers of a perfluoroalkyl-polyether having a thickness of 6 nm and as the end group an adsorption group including CN were formed on the disk surfaces shown in Table 5, and when they were subjected to the contact-start-stop test using a zirconia slider with the one cycle lasting 15 sec, the number of cycles up to the time of a sharp increase in the friction coefficient between the disk and the slider increased twice or more in all of the disks in comparison with the Comparative Example. The number of cycles up to the time of a sharp increase in the friction coefficient between the disk and the slider extended to about 120,000 to 140,000 in the case of the Ti series, and to 1,000,000 or over in the case of the Zr series, and in the case of the $(Zr_{0.5}Nb_{0.5})_{0.5}N_{0.5}$, a sharp increase in the friction coefficient was not observed even after 2,000,000 cycles, indicating particularly high sliding endurance.

The materials shown in this Example and Examples 1, and 3 were formed into two or three laminated layers each having a thickness of 10 nm under the same conditions as this Example, thereby producing magnetic disks having nonmagnetic protective coating layers shown in Table 6.

TABLE 6

| Sample No. | Nonmagnetic protective coating layer | Life ($\times 10^4$) |
| --- | --- | --- |
| Example | | |
| 47 | $(Zr_{0.5}Nb_{0.5})_{0.5}N_{0.5}/(W_{0.99}Zr_{0.01})_{0.5}C_{0.5}$ | 16.3 |
| 48 | $(W_{0.99}Cr_{0.01})_{0.5}C_{0.5}/(W_{0.99}Mo_{0.02})_{0.5}N_{0.5}/(Zr_{0.5}Nb_{0.5})_{0.5}N_{0.5}$ | >20.0 |
| Comparative example 6 | C | 0.1 |

The magnetic disks were subjected to a spherical sliding test by using a sapphire spherical sliding pin having a curvature of 30 mm under a load of 10 gf with the relative speed being 10 m/s, and the pass number required for the complete destruction of the protective coating film to expose the magnetic layer was taken as the life of the magnetic disk. As shown in Table 6, the life of the magnetic disks of this Example was extended considerably in comparison with the Comparative Example, indicating excellent sliding endurance of the magnetic disks of this Example. It was confirmed that the corrosion resistance and the impact resistance of the magnetic disks of this Example were 10 to 200 times as more excellent as those of the Comparative Example.

Example 6

FIG. 7 shows an Example of still another structure. In FIG. 7, reference numeral 51 indicates a nonmagnetic substrate made, for example, of a tempered glass, crystallized glass, surface-glass-coated ceramic, plastic, or Al alloy plated with Ni-P. 52, 52' indicate nonmagnetic metal primary layers made, for example, of Cr, Mo, W, Cr-Ti, Cr-Si, or Cr-W. 53, 53' indicate magnetic layers made, for example, of Co-Ni, Co-Ni-Pt, Co-Ni-Zr, and Co-Cr. 54, 54' indicate nonmagnetic intermediate metal layers containing at least one element selected from the group consisting of Ti, Zr, Hf, Nb, and Ta, and at least one element selected from the group consisting of Pt, Pd, Rh, Ir, Ru, and Os, or at least one element selected from the group consisting of Mo and Ni, Ni; or nonmagnetic intermediate layers whose major component is Ni and which contains at least one element selected from the group consisting of Ti, V, Nb, Ta, Cr, Mo, W, Mn, Fe, Co, Cu, Al, and Si. 55, 55' indicate nonmagnetic protective coating layers made of at least two elements selected from the group consisting of Ti, Zr, Hf, V, Nb, Ta, Cr, Mo, and W, and at least one element selected from the group consisting of N, C, O, and B. Further, organic lubricating layers may be formed on the nonmagnetic protective coating layers. Now, this Example will be described in more detail.

By the RF magnetron sputtering method, on Al-Mg alloy substrate, having a diameter of 89 mm plated with Ni-P to have circumferentially, on the surface, projections having a center line average surface roughness of 15 nm, were formed Cr layers each having a thickness of 350 nm, and $Co_{0.6}Ni_{0.35}Zr_{0.05}$ magnetic layers having a thickness of 45 nm with the substrate temperature being 100° C., the argon gas pressure being 15 mTorr, and the input electric power density being 1 W/cm$^2$. Then $Zr_{0.995}Pt_{0.005}$ or $Ni_{0.7}Cu_{0.3}$ layers were formed each having a thickness of 10 nm under the same conditions as above. Further, $(Cr_{0.5}Nb_{0.5})_{0.5}B_{0.5}$ layers having a thickness of 40 nm were formed by the RF magnetron sputtering method with the substrate temperature being 150° C., the argon gas pressure being 10 mTorr, and the input electric power density being 5 W/cm$^2$, thereby completing the magnetic disks for testing. The magnetic disks were subjected to an NaCl spray test using an aqueous solution of 1 mol of NaCl/l at 50° C. for 64 hours to assess the corrosion resistance. After 64 hours, it was found that the saturation magnetization Ms of the disks without the $Zr_{0.995}Pt_{0.005}$ or $Ni_{0.7}Cu_{0.3}$ nonmagnetic intermediate metal layer lowered by 5%, while the saturation magnetization Ms of the disks having the $Zr_{0.995}Pt_{0.005}$ or $Ni_{0.7}Cu_{0.3}$ nonmagnetic intermediate metal layers did not lower at all, showing the excellent corrosion resistance of the disks. With respect to the sliding endurance, it was confirmed that the life was elongated twice or more.

Example 7

Now, still another Example will be described using magnetic disks having the structure shown in FIG. 7.

By the RF magnetron sputtering method, on a tempered glass substrate, having a diameter of 130 mm and scratched circumferentially to have a center line average surface roughness of 5 nm on the surface, were formed Cr layers having a thickness of 300 nm, and $Co_{0.6}Ni_{0.35}Zr_{0.05}$ layers having a thickness of 50 nm with the substrate temperature being 100° C., the argon gas pressure being 15 mTorr, and the input electric power density being 1 W/cm$^2$. Then layers having a thickness of 10 nm and consisting of Ni containing 21 wt. % of Cr, 9 wt. % of Mo, and 4 wt. % of W were formed under the same conditions. Then by the DC magnetron reactive sputtering method, layers of $(Zr_{0.5}Hf_{0.5})_{0.5}N_{0.5}$ having a thickness of 20 nm were formed thereon with the substrate temperature being 150° C., the pressure of a mixed gas of 50 vol. % of argon, and 50 vol. % of nitrogen being 5 mTorr, and the input electrical power density being 5 W/cm$^2$, thereby completing a magnetic for testing. The magnetic disk was placed in an air conditioned tank kept at 60° C., 90% RH, and a cleanness class of 1000, and the corrosion resistance was assessed. After 100 hours, missing errors of the disk not having such an Ni-Cr-Mo-W alloy nonmagnetic intermediate metal layer increased by 5 in number per the surface, while any increase in missing errors of the disk having the above Ni-Cr-Mo-W nonmagnetic intermediate layers was not recognized, indicating good corrosion resistance of the disk, made by the present invention.

Example 8

Figure 8:
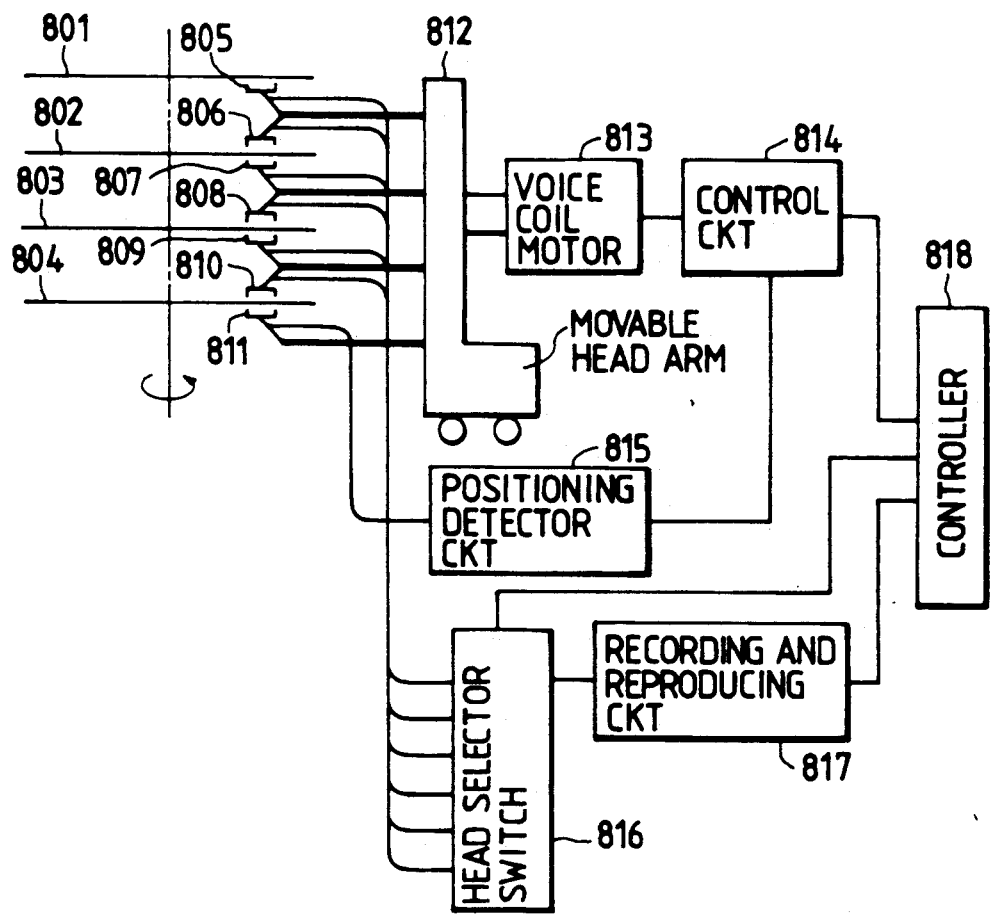
FIG. 8 is a block diagram of the magnetic storage of Example 8.

A magnetic storage that used magnetic disks according to the present invention was produced. FIG. 8 shows a block diagram of the magnetic storage. In FIG. 8, reference numerals 801 to 804 indicate magnetic disks, 805 to 811 indicate metal-in-gap type (MIG) magnetic heads having for example CoTaZr alloy, or FeAlSi alloy in the gap section, or thin film magnetic heads having, for example, NiFe alloy, CoFe alloy, or CoTaZr alloy as magnetic pole material, 812 indicates a movable head arm, 813 indicates a voice coil motor, 814 indicates a control circuit, 815 indicates a positioning detector circuit, 816 indicates a head selecting switch, 817 indicates a recording and reproducing circuit, and 818 indicates a controller.

Now, this Example will be described in more detail.

Four magnetic disks named Sample No. 1 given in Example 1 above were used as the recording media, and seven thin film magnetic heads using, as magnetic pole material, CoTaZr alloy were combined, thereby making a magnetic storage having a constitution shown in FIG. 8. The average storage life of this magnetic storage up to the time of occurrence of an error was measured, and it was found that the average storage life was 10 times or more as long as that of a magnetic storage using prior magnetic disks of the prior art, indicating high reliability of the magnetic storage of this Example. When the magnetic disks according to the present invention were used, the protective film itself could be made thinner than prior protective films, and since the magnetic head flying height could be reduced in comparison with prior magnetic storages, the phase margin at the time of the reproduction of the recorded signals was made wide, and therefore the recording density could be increased 1.5 times or more in comparison with the prior magnetic storages.

Although, in this Example, the magnetic disks named Sample No. 1 given in Example 1 above were used, needless to say, other magnetic disks according to the present invention, e.g., the magnetic disks shown in Examples 1 to 7 above can be used. Further, although, in this Example, four magnetic disks were used, an effect similar to the above effect was confirmed in the case of a magnetic storage using two magnetic disks or eight magnetic disks. There is no restriction on the number of magnetic disks to be used, and any number of magnetic disks can be used. Although, in this Example, thin film magnetic heads using, as magnetic pole material, CoTaZr alloy were used, an effect similar to the above effect was obtained in the case using, for example, thin film magnetic heads using as magnetic pole material, for example, NiFe alloy or CoFe alloy, or in the case using metal-in-gap type (MIG) magnetic heads having, for example, CoTaZr alloy, or FeAlSi alloy in the gap section.

The following Examples are directed to cases using composite magnetic thin films of the present invention.

Example 9

Figure 9:
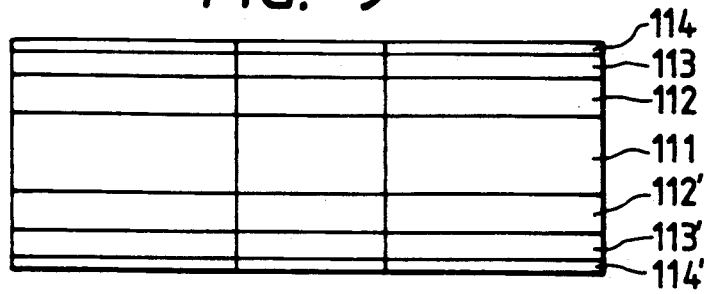
FIGS. 9 to 11 are sectional views of the magnetic disks of other Examples.

Referring to FIG. 9, reference numeral 111 indicates a nonmagnetic substrate made, for example, of a tempered glass, organic resin, or Ni-P-plated Al alloy or Ti alloy. 112, 112' indicate second magnetic thin film comprising continuous thin films made of a ferromagnetic material such as CoCr, CoTi, FePt, NiPt, CoMo, CoPt, CoNiPt, and CoCrPt. 113, 113' indicate first magnetic thin films different in the composition and component from the second magnetic thin film, and made, for example, of GdFeCoNbN, CoNiZrCrN, CoCrTaN, CoMoC, CoTaZrN, CoNiZrSi, or CoNiTaB, and 114, 114' indicate organic lubricating films made for example, of a perfluoroalkylpolyether.

Now, this Example will be described more in detail.

On Al alloy substrates, having a diameter of 130 mm, plated with Ni-P, and having circumferential projections having a center line average roughness of 10 nm, were formed second magnetic films 112, 112' having a thickness of 40 nm, and successively first magnetic films 113, 113' having a thickness of 20 nm by using targets having approximately the same compositions as those of the films to be formed with the argon gas pressure being 5 mTorr, and the input electric power density being 2 W/cm$^2$. Then liquid lubricating agents 114, 114' made of a perfluoroalkylpolyether having OH groups and having a thickness of 4 nm were formed thereon.

TABLE 7

|    | 113,113'                              | 112,112'                    |
|----|---------------------------------------|-----------------------------|
| 1  | $Co_{0.74}Ta_{0.03}Zr_{0.03}N_{0.2}$ | $Co_{0.8}Ni_{0.2}Pt_{0.2}$ |
| 2  | $Co_{0.74}Ta_{0.03}Zr_{0.03}N_{0.2}$ | $Co_{0.6}Ni_{0.2}Pt_{0.2}$ |
| 3  | $Co_{0.74}Ta_{0.03}Zr_{0.03}N_{0.2}$ | $Co_{0.6}Ni_{0.2}Pt_{0.2}$ |
| 4  | $Co_{0.74}Ta_{0.03}Zr_{0.03}N_{0.2}$ | $Co_{0.6}Ni_{0.2}Pt_{0.2}$ |
| 5  | $Co_{0.74}Ta_{0.03}Zr_{0.03}N_{0.2}$ | $Co_{0.6}Ni_{0.2}Pt_{0.2}$ |
| 6  | $Fe_{0.8}Cr_{0.1}N_{0.3}$            | $Co_{0.6}Ni_{0.3}Pt_{0.1}$ |
| 7  | $Ni_{0.6}Ti_{0.1}N_{0.3}$            | $Co_{0.6}Ni_{0.2}Pt_{0.2}$ |
| 8  | $Co_{0.6}Hf_{0.1}N_{0.3}$            | $Co_{0.6}Ni_{0.2}Pt_{0.2}$ |
| 9  | $Co_{0.6}V_{0.1}N_{0.3}$             | $Co_{0.6}Ni_{0.2}Pt_{0.2}$ |
| 10 | $Co_{0.8}Nb_{0.1}N_{0.3}$            | $Co_{0.6}Ni_{0.2}Pt_{0.2}$ |
| 11 | $Fe_{0.6}Mo_{0.1}N_{0.3}$            | $Co_{0.6}Ni_{0.2}Pt_{0.2}$ |
| 12 | $Fe_{0.6}W_{0.1}N_{0.3}$             | $Co_{0.6}Ni_{0.2}Pt_{0.2}$ |

Each of all the magnetic disks produced by this method had a single coercive force, and the first layers were amorphous or in the form of very fine crystals 125, 125' made of a perfluoroalkylpolyether having an adsorbing end group and with a thickness of 3 nm were formed by the dipping method.

TABLE 8

| | 122,122' | 123,123' | | 124,124' |
|---|---|---|---|---|
| 1 | Cr | $Co_{0.56}Ni_{0.4}Zr_{0.04}$ | (40 nm) | $Co_{0.56}Ni_{0.2}Nb_{0.04}N_{0.2}$ |
| 2 | $Cr_{0.7}Ti_{0.3}$ | $Co_{0.62}Ni_{0.3}Zr_{0.04}Cr_{0.04}$ | (40 nm) | $Co_{0.56}Ni_{0.2}Ta_{0.04}N_{0.2}$ |
| 3 | Ti | $Co_{0.3}Cr_{0.15}Ta_{0.05}$ | (250 nm) | $Co_{0.69}W_{0.08}Zr_{0.03}N_{0.2}$ |
| 4 | $Ti_{0.82}Nb_{0.18}$ | $Co_{01.8}Cr_{0.15}Nb_{0.05}$ | (250 nm) | $Co_{0.69}Mg_{0.03}Zr_{0.03}N_{0.2}$ | having a size of 100 Å or below.

The magnetic disks of this Example were included together with metal-in-gap type (MIG) magnetic heads in a magnetic disk apparatus, then the contact-start-stop property (CSS) was assessed, and it was found that all of them showed excellent sliding endurance (100K or more). Their recording/reproducing characteristics were very high, 25KFCI (kilo flux change per inch) or over, at half maximum recording density $D_{50}$. When the apparatus was allowed to stand for 3 months in an air-conditioned tank kept at 60° C., and 80% RH, the number of increase of the error was 5 or less per surface in any of the disks, indicating quite good corrosion resistance. In the cases containing Ti, Zr, Hf, Nb, and Ta, no increase of the error was not found, indicating the highest corrosion resistance. When a nonmagnetic layer on the order of 50 Å or over was placed between the first magnetic layer and the second magnetic layer, there were two coercive force values, and $D_{50}$ was as low as 10KFCI or below.

When, as Comparative Example, 113, 113' were C films having a thickness of 20 mm, the CSS strength was 50K or below, the number of the increase of the error was 200 or over, and $D_{50}$ was 20KFCI.

Example 10

Figure 10:
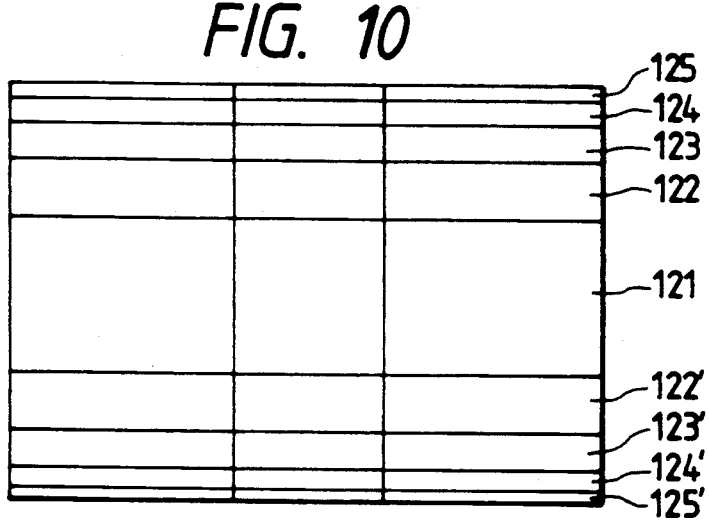

Another Example of the present invention will be described with reference to FIG. 10. Reference numeral 121 indicates a nonmagnetic substrate made, for example, of a reinforced plastic, a tempered glass, or an Ni-P plated Al alloy. 122, 122' indicate nonmagnetic primary layers made, for example, of Cr, Cr-Ti alloy, Mo, Mo-Si alloy. W, Ti, Ti-Nb alloy, or Ti-Ta alloy, 123, 123' indicate second magnetic thin films made, for example, of CoCr, CoCrTa, CoNi, CoNiZr, CoNiZrCr, CoNiCr, CoTi, CoTa, or CoFePt. 124, 124' indicate first magnetic films of the present invention that were different in the micro structure, composition, and component from the second magnetic thin film, and were made, for example, of CoNiN, CoCrN, CoN, Fe-N, or Ni-N. 125, 125' indicate nonmagnetic lubricating films made, for example, of a perfluoroalkylpolyether, $MoS_2$, C, or ZrN.

Now, this Example will be described in more detail.

By the DC sputtering method, on tempered glass substrate 121, having a diameter of 89 mm and possessing circumferential projections having a center line average surface roughness of 12 nm, were formed nonmagnetic primary layers 122, 122' having a thickness of 300 nm as shown in Table 8 with the argon gas pressure being 10 mTorr, and the input electric power density being 5 W/cm². Then second magnetic layers 123, 123', and first magnetic layers 124, 124' having a thickness of 30 nm with the input electric power density being 3 W/cm² were formed. Finally, liquid lubricating agents Any of the magnetic disks showed a single coercive force. The first magnetic layers were dominantly amorphous, or crystalline and were made up of fine crystal grains having a grain size of 100 Å or below. The magnetic disks of this Example were included together with recording/reseparating type thin film magnetic heads (induction type/magnetoresistive composite heads) in a magnetic disk apparatus, then the CSS characteristics were assessed to find 60K or over, indicating excellent sliding endurance. Further, the recording and reproducing characteristics were very high, 30KFCI or higher at the half maximum recording density $D_{50}$. When the apparatus was allowed to stand for three months in an air-conditioned tank kept at 60° C. and 80% RH, an increase of the error was not found in any case, indicating high corrosion resistance.

When, as Comparative Example, instead of the first magnetic layers 124, 124', C films having a thickness of 30 mm were used, the CSS strength was 50K or below, the $D_{50}$ was 20KFCI or below, and the number of the increase of the error was 100 or over.

Example 11

Figure 11:
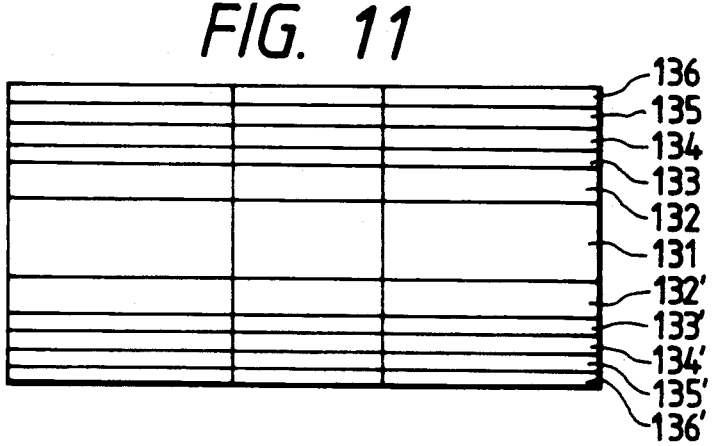

Still another Example will be described with reference to FIG. 11. Reference numeral 131 indicates a nonmagnetic substrate made, for example, of Ti alloy, or an Ni-P plated Al alloy. 132, 132' indicate nonmagnetic primary layers made, for example, of Cr, Mo, W, Ti, or Ti-Cr. 133, 133' indicate third magnetic alloy thin films made, for example, of Co-Cr, Co-Ti, Co-Si, Co-Al, CoCrTa, or CoCrPt. 134, 134' indicate second magnetic alloy thin films that were different in the composition and component from the third magnetic thin film and were made, for example, of CoNiZr, CoNiZrCr, or CoNiPt. 135, 135' indicate first magnetic thin films made of a nitride, for example, of GdTbCoFe, and Co. 136, 136' indicate nonmagnetic coating layers made, for example, of a perfluoroalkylpolyether.

This Example will now be described in more detail.

By the DC sputtering method, on surface-glass-coated ceramic substrate 131, having a diameter of 50 mm and possessing circumferential projections having a center line average surface roughness of 8 nm, were formed nonmagnetic primary layers 132, 132' having a thickness of 200 nm, third magnetic layers 133, 133' having a thickness of 20 nm, second magnetic layers 134, 134' having a thickness of 20 nm, and first magnetic layers 135, 135' having a thickness of 30nm as shown in Table 9 with the argon gas pressure being 15 mTorr, and the input electric power density being 2 W/cm². Then organic lubricating agents 136, 136' consisting of a perfluoroalkylpolyether having ester groups were formed to have a thickness of 50 nm by the dipping method, thereby producing magnetic disks. Any of them had a single coercive force.

TABLE 9

| | 132, 132' | 133, 133' | 134, 134' | 135, 135' |
|---|---|---|---|---|
| 1 | Cr | $Co_{0.08}Cr_{0.15}Ta_{0.05}$ | $Co_{0.7}Fe_{0.2}Pt_{0.1}$ | $Tb_{0.18}Fe_{0.65}Co_{0.03}Nb_{0.03}N_{0.03}$ |
| 2 | Cr | $Co_{0.08}Cr_{0.12}Ta_{0.05}Si_{0.03}$ | $Co_{0.7}Ni_{0.25}Zr_{0.05}$ | $Tb_{0.18}Fe_{0.65}Co_{0.03}Nb_{0.03}N_{0.03}$ |
| 3 | $Ti_{0.32}Nb_{0.13}$ | $Co_{0.78}Cr_{0.22}$ | $Co_{0.32}Al_{0.13}$ | $Tb_{0.18}Fe_{0.65}Co_{0.03}Nb_{0.03}N_{0.03}$ |
| 4 | $Ti_{0.32}Ta_{0.13}$ | $Co_{0.73}Cr_{0.22}$ | $Co_{0.32}Al_{0.13}$ | $Tb_{0.16}Fe_{0.65}Co_{0.03}Nb_{0.03}B_{0.03}$ |

The magnetic disks of this Example were included, together with induction type thin film magnetic heads or optical heads for reproducing by the Kerr effect, in a magnetic disk apparatus, and the CSS characteristics were assessed to find 50K or over in any of them, indicating excellent sliding endurance. The recording/reproducing characteristics were very high, 30KFCI or over at the half maximum recording density $D_{50}$. When the apparatus was allowed to stand for three months in an airconditioned tank kept at 60° C. and 80% RH, the number of the increase of the error was 5 or below, indicating good corrosion resistance.

When, as a Comparative Example, instead of the first magnetic layers 135, 135', C films having a thickness of 30 nm were used, the CSS strength was 50K or below, the $D_{50}$ was 20KFCI or below, and the number of the increase of the error was 250 or higher.

As apparent from the above description, according to the present invention, since the magnetic recording media having nonmagnetic protective coating layers, or nonmagnetic protective coating layers and nonmagnetic intermediate metal layers are excellent in wear resistance, and corrosion resistance, a magnetic recording medium and a magnetic storage that is suitable for high density recording, and has practically enough endurance can be provided.

In the present invention having composite magnetic thin films, and using a magnetic alloy for protective coating layers, since magnetic flux can be obtained from the protective films high in sliding endurance, high density and high reproducing power can be obtained, and therefore a magnetic storage having a large storage capacity and high reliability can be provided. Further, since the protective films have magnetism, and therefore the spacing between effective head media to obtain the same recording density can be increased, there is an effect to further increase the reliability.

What is claimed is:

1. A magnetic recording medium having at least one nonmagnetic protective coating layer on a magnetic continuous thin film and having a nonmagnetic support for said magnetic continuous thin film, said nonmagnetic protective coating layer consisting essentially of at least two elements selected from a first group consisting of Ti, Zr, Hf, V, Nb, Ta, Cr, Mo, and W, and at least one element selected from a second group consisting of N, C, O, and B wherein the composition of said nonmagnetic protective coating layer is substantially homogeneous from one face side through the opposite face side.

2. The magnetic recording medium as claimed in claim 1, wherein the content of one element of said first group is from 0.1 at. % to up to 99.9 at. %, assuming the total amount of the elements of the first group to be 100 at. %.

3. The magnetic recording medium as claimed in claim 1, wherein the total amount of the elements of the first group is from 10 at. % to up to 99 at. %, assuming the total amount of the elements of the first group, and the second group to be 100 at. %.

4. The magnetic recording medium as claimed in claim 1, wherein said nonmagnetic protective coating layer contains at least Zr, Hf, or Nb.

5. The magnetic recording medium as claimed in claim 1, wherein said nonmagnetic protective coating layer contains at least W.

6. The magnetic recording medium as claimed in claim 1, wherein said nonmagnetic protective coating layer contains further at least one element selected from the group consisting of Y, Mg, Ca, Al, and Si in an amount of from 0.1 at. % to up to 20 at. % based on the total amount of the elements of the first group.

7. The magnetic recording medium as claimed in claim 1, wherein the thickness of said nonmagnetic protective coating layer is from 5 nm to up to 60 nm.

8. The magnetic recording medium as claimed in claim 1, wherein a nonmagnetic intermediate metal layer is positioned between said nonmagnetic protective coating layer and said magnetic continuous thin film.

9. The magnetic recording medium as claimed in claim 4, wherein said nonmagnetic protective coating layer contains at least N.

10. The magnetic recording medium as claimed in claim 5, wherein said nonmagnetic protective coating layer contains at least N.

11. The magnetic recording medium as claimed in claim 5, wherein said nonmagnetic protective coating layer contains at least C.

12. The magnetic recording medium as claimed in claim 8, wherein said nonmagnetic intermediate metal layer contains at least one element selected from a group consisting of Pt, Pd, Rh, Ir, Ru, and Os in an amount of from down to 0.01 at. % to up to 1 at. % in all, or at least one element selected from a group consisting of Mo and Ni in an amount of from down to 0.1 wt. % to up to 1 st. % in all, and the balance of one element selected from a group consisting of Ti, Zr, Hf, Nb, and Ta.

13. The magnetic recording medium as claimed in claim 8, wherein said nonmagnetic intermediate metal layer consists of an Ni alloy containing from down to 1 wt. % to up to 40 wt. % of at least one element selected from a group consisting of Ti, V, Nb, Ta, Cr, Mo, W, Mn, Fe, Co, Cu, Al, and Si.

14. The magnetic recording medium as claimed in claim 8, wherein the thickness of said nonmagnetic intermediate metal layer is from 2 nm to up to 15 nm.

15. The magnetic recording medium as claimed in claim 13, wherein said nonmagnetic intermediate metal layer consists of an Ni alloy containing from 27 wt. % to up to 34 wt. % of Cu.

16. The magnetic recording medium as claimed in claim 13, wherein said nonmagnetic intermediate metal layer consists of an Ni alloy containing from 2 wt. % to up to 32 wt. % of Mo, and from 13 wt. % to up to 25 wt. % of Cr.

17. The magnetic recording medium having at least one nonmagnetic protective coating layer on a magnetic continuous thin film and having a nonmagnetic support for said magnetic continuous thin film, said nonmagnetic protective coating layer consisting essentially of at least two elements selected from a first group consisting of Ti, Zr, Hf, V, Nb, Ta, Cr, Mo, and W, and at least one element selected from a second group consisting of N, O, and B wherein the composition of said nonmagnetic protective coating layer is substantially homogeneous from one face side through the opposite face side.

18. The magnetic recording medium having at least one nonmagnetic protective coating layer on a magnetic continuous thin film and having a nonmagnetic support for said magnetic continuous thin film, said nonmagnetic protective coating layer comprising at least two elements selected from a first group consisting of Ti, Zr, Hf, V, Nb, Ta, Cr, Mo, and W, and C wherein the composition of said nonmagnetic protective coating is substantially homogeneous from one face side through the opposite face side and wherein said at least two elements selected from said first group contain at least a pair of elements selected from the group consisting of Ti-V, Ti-Nb, Ti-Cr, Ti-Mo, Zr-Hf, Zr-Nb, Zr-Ta, Zr-Cr, Zr-Mo, Zr-W, Hf-Nb, Hf-Ta, Hf-Cr, Hf-Mo, Hf-W, V-Nb, V-Ta, V-Cr, V-Mo, V-W, Nb-Ta, Nb-Cr, Nb-Mo, Nb-W, Ta-Cr, and Ta-Mo.

19. A magnetic recording medium having at least one nonmagnetic protective coating layer on a magnetic continuous thin film and having a nonmagnetic support for said continuous thin film, said nonmagnetic protective coating layer comprising at least two elements selected from a first group consisting of Ti, Zr, Hf, V, Nb, Ta, Cr, Mo, and W, and at least two elements selected from a second group consisting of N, C, O, and B wherein the composition of said nonmagnetic protective coating layer is substantially homogeneous from one face side through the opposite face side.

20. The magnetic recording medium as claimed in claim 19, wherein the content of one element of said first group is from 0.1 at. % to up to 99.9 at. %, assuming the total amount of the elements of the first group to be 100 at. %.

21. The magnetic recording medium as claimed in claim 19, wherein the total amount of the elements of the first group is from 10 at. % to up to 99 at. %, assuming the total amount of the elements of the first group, and the second group to be 100 at. %.

22. The magnetic recording medium as claimed in claim 19, wherein said nonmagnetic protective coating layer contains at least Zr, Hf, or Nb.

23. The magnetic recording medium as claimed in claim 19, wherein said nonmagnetic protective coating layer contains at least W.

24. The magnetic recording medium as claimed in claim 19, wherein said nonmagnetic protective coating layer further at least one element selected from the group consisting of Y, Mg, Ca, Al, and Si in an amount of from 0.1 at. % to up to 20 at. % based on the total amount of the elements of the first group.

25. The magnetic recording medium as claimed in claim 19, wherein the thickness of said nonmagnetic protective coating layer is from down to 5 nm to up to 60 nm.

26. The magnetic recording medium as claimed in claim 19, wherein a nonmagnetic intermediate metal layer is positioned between said nonmagnetic protective coating layer and said magnetic continuous thin film.

27. The magnetic recording medium as claimed in claim 22, wherein said nonmagnetic protective coating layer contains at least N.

28. The magnetic recording medium as claimed in claim 23, wherein said nonmagnetic protective coating layer contains at least N.

29. The magnetic recording medium as claimed in claim 23, wherein said nonmagnetic protective coating layer contains at least C.

30. The magnetic recording medium as claimed in claim 26, wherein said nonmagnetic intermediate metal layer contains at least one element selected from a group consisting of Pt, Pd, Rh, Ir, Ru, and Os in an amount of from 0.01 at. % to up to 1 at. % in all, or at least one element selected from a group consisting of Mo and Ni in an amendment of from 0.1 wt. % to up to 1 wt. % in all, and the balance of one element selected from a group consisting of Ti, Zf, Hf, Nb, and Ta.

31. The magnetic recording medium as claimed in claim 26, wherein said nonmagnetic intermediate metal layer consists of an Ni alloy containing from 1 wt. % to up to 40 wt. % of at least one element selected from a group consisting of Ti, V, Nb, Ta, Cr, Mo, W, Mn, Fe, Co, Cu, Al, and Si.

32. The magnetic recording medium as claimed in claim 26, wherein the thickness of said nonmagnetic intermediate metal layer is from 2 nm to up to 15 nm.

33. The magnetic recording medium as claimed in claim 31, wherein said nonmagnetic intermediate metal layer consists of an Ni alloy containing from 27 wt. % to up to 34 wt. % of Cu.

34. The magnetic recording medium as claimed in claim 31, said nonmagnetic intermediate metal layer consisting of an Ni alloy containing from 2 wt. % to up to 32 st. % of Mo, and 13 wt. % to up to 25 wt. % of Cr.

35. A magnetic recording medium having at least one nonmagnetic protective coating layer on a magnetic continuous thin film and having a nonmagnetic support for said magnetic continuous thin film, said nonmagnetic protective coating layer comprising at lesat two elements selected from a first group consisting of Ti, Zr, Hf, V, Nb, Ta, Cr, Mo, and W, and at least two elements selected from a second group consisting of N, O, and B wherein the composition of said nonmagnetic protective coating layer is substantially homogeneous from one face side through the opposite face side.

36. A composite magnetic recording medium having at least two magnetic continuous thin films and having a nonmagnetic support for said magnetic continuous thin films, the first magnetic continuous thin film on the information recording side consisting essentially of at least one element selected from a first group consisting of Co, Fe, N, and Gd, at least one element selected from a second group consisting of Ti, Zr, Hf, V, Nb, Ta, Cr, Mo, and W, and at least one element selected from a third group consisting of N, C, O, B, and Si.

37. The magnetic recording medium as claimed in claim 36, wherein the all the magnetic continuous thin films constituting said composite magnetic thin film are joined magnetically, and are magnetized and reversed with the same coercive force against the external magnetic field.

38. The magnetic recording medium as claimed in claim 36, said magnetic recording medium having the first magnetic continuous thin film wherein the total amount of the elements of the second group is from 3 at. % to up to 60 at. %, assuming the total amount of the elements of the first group, and the second group to be 100 at. %.

39. The magnetic recording medium as claimed in claim 36, said magnetic recording medium having the first magnetic continuous thin film wherein the total amount of the elements of the third group is from 6 at. % to up to 80 at. %, assuming the total amount of the elements of the first group, and the second group to be 100 at. %.

40. The magnetic recording medium as claimed in claim 36, wherein the thickness of said first magnetic continuous thin film is from 5 nm to up to 100 nm.

41. The magnetic recording medium as claimed in claim 36, wherein an organic lubricating film is provided directly on said first magnetic continuous thin film.

42. A magnetic storage device, comprising (i) at least one magnetic recording medium having at least one nonmagnetic protective coating layer on a magnetic continuous thin film and having a nonmagnetic support for said magnetic continuous thin film, said nonmagnetic protective coating layer being made up of at least two elements selected from a first group consisting of Ti, Zr, Hf, V, Nb, Ta, Cr, Mo, and W, and at least one element selected from a second group consisting of N, C, O, and B, and (ii) a magnetic head having a metal magnetic alloy as at least part of a magnetic core, and said magnetic head being provided in such a position that signals can be recorded in or reproduced from said magnetic recording medium.

43. A magnetic recording medium having at least one nonmagnetic protective coating layer on a magnetic continuous thin film and having a nonmagnetic support for said magnetic continuous thin film, said nonmagnetic protective coating layer comprising at least two layers which are different in composition from each other and each of which comprises at least two elements selected from a first group consisting of Ti, Zr, Hf, V, Nb, Ta, Cr, Mo, and W, and at least one element selected from a second group consisting of N, C, O, and B.

44. A magnetic recording medium having at least one nonmagnetic protective coating layer on a magnetic continuous thin film and having a nonmagnetic support for said magnetic continuous thin film, said nonmagnetic protective coating layer comprising at least two layers which are different in composition from each other and each of which comprises at least two elements selected from a first group consisting of Ti, Zr, Hf, V, Nb, Ta, Cr, Mo, and W, and at least two elements selected from a second group consisting of N, C, O, and B.

* * * * *

UNITED STATES PATENT AND TRADEMARK OFFICE
CERTIFICATE OF CORRECTION

PATENT NO. : 5,236,791
DATED : Aug. 17, 1993
INVENTOR(S) : Yotsuo Yahisa

It is certified that error appears in the above-indentified patent and that said Letters Patent is hereby corrected as shown below:

| Column | Line | |
|---|---|---|
| 1 | 15 | After "density" delete "of". |
| 1 | 31 | Change "mediums" to --media--. |
| 5 | 66 | Change "...C$_0$ $_5$" to --C$_{0.5}$--. |
| 6 | 15 | After "primary" insert --layers--. |
| 6 | 55 | After "film" insert --having a--. |
| 9 | 33 | After "formed," insert --and--. |
| 13 | 34 | Change "Mo0.02)$_{0.5}$N$_{0.5}$" to --Mo$_{0.02}$)$_{0.5}$N$_{0.5}$--. |
| 14 | 41 | Before "observed" delete "not". |
| 15 | 39 | Change "any scar was not" to --no scar was--. |

UNITED STATES PATENT AND TRADEMARK OFFICE
CERTIFICATE OF CORRECTION

PATENT NO. : 5,236,791
DATED : Aug. 17, 1993
INVENTOR(S) : Yotsuo Yahisa

It is certified that error appears in the above-indentified patent and that said Letters Patent is hereby corrected as shown below:

| Column | Line | |
|---|---|---|
| 15 | 64 | Change "on glass" to --on a glass--. |
| 15 | 65 | Change "substrates" to --substrate--. |
| 16 | 3 | Change ", then" to --. Then--. |
| 16 | 8 | Change ", then" to --. Then--. |
| 16 | 10 | Change "producing" to --finishing production of--. |
| 16 | 23 | Change "...$Hf_{0.50.5}$..." to --$Hf_{0.5})_{0.5}$...--. |
| 16 | 66 | Before "magnetic" insert --the--. |
| 17 | 39 | Change "...$Nb_{0.5})$..." to --...$Nb_{0.5})$...--. |
| 18 | 20 | After "and" delete "Ni,". |

UNITED STATES PATENT AND TRADEMARK OFFICE
CERTIFICATE OF CORRECTION

PATENT NO. : 5,236,791
DATED : Aug. 17, 1993
INVENTOR(S) : Yotsuo Yahisa

It is certified that error appears in the above-indentified patent and that said Letters Patent is hereby corrected as shown below:

| Column | Line | |
|---|---|---|
| 20 | TABLE 7 | Change "2     $Co_{0.74}Ta_{0.03}Zr_{0.03}N_{0.2}$" to --2     $Co_{0.74}Ta_{0.03}Zr_{0.03}C_{0.2}$--. |
| | | Change "3     $Co_{0.74}Ta_{0.03}Zr_{0.03}N_{0.2}$" to --3     $Co_{0.74}Ta_{0.03}Zr_{0.03}Si_{0.2}$--. |
| | | Change "4     $Co_{0.74}Ta_{0.03}Zr_{0.03}N_{0.2}$" to --4     $Co_{0.74}Ta_{0.03}Zr_{0.03}B_{0.2}$--. |
| | | Change "4     $Co_{0.74}Ta_{0.03}Zr_{0.03}N_{0.2}$" to --5     $Co_{0.74}Ta_{0.03}Zr_{0.03}O_{0.2}$--. |
| | | Change "6     $Fe_{0.8}$..." to --6     $Fe_{0.6}$...--. |
| | | Change "10    $Co_{0.8}$..." to --10    $Co_{0.6}$...--. |
| 21 | 42 | Change "121" to --121--. |

UNITED STATES PATENT AND TRADEMARK OFFICE
CERTIFICATE OF CORRECTION

PATENT NO. : 5,236,791
DATED : Aug. 17, 1993
INVENTOR(S) : Yotsuo Yahisa

It is certified that error appears in the above-indentified patent and that said Letters Patent is hereby corrected as shown below:

| Column | Line | |
|---|---|---|
| 22 | Table 8 | Change "4 ...$Co_{01.8}$..." to --4 ...$Co_{0.8}$...--. |
| 22 | 48 | Change "CoNiPt," to --CoNiPt.--. |
| 23-24 | TABLE 9 | Change to read as follows: |

Table 9

| | 132, 132' | 133, 133' | 134, 134' | 135, 135' |
|---|---|---|---|---|
| 1 | Cr | $Co_{0.80}Cr_{0.15}Ta_{0.05}$ | $Co_{0.7}Fe_{0.2}Pt_{0.1}$ | $Tb_{0.15}Fe_{0.85}Co_{0.05}Nb_{0.03}N_{0.05}$ |
| 2 | Cr | $Co_{0.80}Cr_{0.12}Ta_{0.05}Si_{0.03}$ | $Co_{0.7}Ni_{0.25}Zr_{0.05}$ | $Tb_{0.15}Fe_{0.85}Co_{0.05}Nb_{0.03}N_{0.05}$ |
| 3 | $Ti_{0.82}Nb_{0.18}$ | $Co_{0.78}Cr_{0.22}$ | $Co_{0.82}Al_{0.18}$ | $Tb_{0.15}Fe_{0.85}Co_{0.05}Nb_{0.03}N_{0.05}$ |
| 4 | $Ti_{0.82}Ta_{0.18}$ | $Co_{0.78}Cr_{0.22}$ | $Co_{0.82}Al_{0.18}$ | $Tb_{0.15}Fe_{0.85}Co_{0.05}Nb_{0.03}N_{0.05}$ |

UNITED STATES PATENT AND TRADEMARK OFFICE
CERTIFICATE OF CORRECTION

PATENT NO. : 5,236,791
DATED : Aug. 17, 1993
INVENTOR(S) : Yotsuo Yahisa

It is certified that error appears in the above-indentified patent and that said Letters Patent is hereby corrected as shown below:

| Column | Line | |
|--------|------|---|
| 24 | 44 | Change "1 st." to --1 wt.--. |
| 24 | 65 | Change "The" to --A--. |
| 25 | 9 | Change "The" to --A--. |
| 25 | 54 | After "layer" insert --contains--. |
| 26 | 15 | Change "Zf," to --Zr,--. |
| 26 | 37 | Change "lesat" to --least--. |

Signed and Sealed this

Twenty-first Day of June, 1994

Attest:

BRUCE LEHMAN

*Attesting Officer*     *Commissioner of Patents and Trademarks*